United States Patent
Okamoto

(10) Patent No.: US 8,537,827 B2
(45) Date of Patent: Sep. 17, 2013

(54) SYSTEM AND METHOD FOR ESTABLISHING A COMMUNICATION PATH USING LABELS

(75) Inventor: Takuya Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 13/103,603

(22) Filed: May 9, 2011

(65) Prior Publication Data

US 2011/0292940 A1    Dec. 1, 2011

(30) Foreign Application Priority Data

May 26, 2010   (JP) ................. 2010-120462

(51) Int. Cl.
*H04L 12/28* (2006.01)
*H04L 12/56* (2011.01)

(52) U.S. Cl.
USPC ....................... 370/392; 370/395.3

(58) Field of Classification Search
USPC ................... 370/389, 392, 395.3
See application file for complete search history.

(56) References Cited

U.S. PATENT DOCUMENTS 6,606,681 B1 * 8/2003 Uzun ................ 711/108
7,561,580 B1 * 7/2009 Johri et al. .......... 370/395.5

FOREIGN PATENT DOCUMENTS

JP    2007-235579 A    9/2007

OTHER PUBLICATIONS

Wroclawski, John et al., "The Use of RSVP with IETF Integrated Services", IETF RFC2210, Sep. 1997, pp. 1-33.

* cited by examiner

*Primary Examiner* — Ronald Abelson
(74) *Attorney, Agent, or Firm* — Fujitsu Patent Center

(57) ABSTRACT

A communication path is established by a sequence of nodes so that a data packet is transferred using labels each being assigned to a data link connecting each pair of adjacent nodes along the communication path. The sequence of nodes includes an origination node, one or more relay node, and a termination node, with being positioned in this order along the communication path. The origination node provides each of downstream nodes of the origination node with a path message for requesting establishment of the communication path. Each relay node, upon being provided with label assignment request information, performs label assignment processing for assigning a label to a data link connecting the relay node and an adjacent upstream node without depending on the label assignment processing performed on other nodes along the communication path so that the label assignment processing is concurrently performed on each of the downstream nodes.

15 Claims, 30 Drawing Sheets

| INPUT INTERFACE | INPUT LABEL | OUTPUT LABEL | OUTPUT INTERFACE |
|---|---|---|---|
| IF 31 | 100 | 200 | IF 32 |
| IF 32 | 20 | 40 | IF 33 |

| INPUT INTERFACE | INPUT LABEL | OUTPUT LABEL | OUTPUT INTERFACE |
|---|---|---|---|
| IF 41 | 100 | - | IF 43 |
| IF 42 | 200 | - | IF 44 |

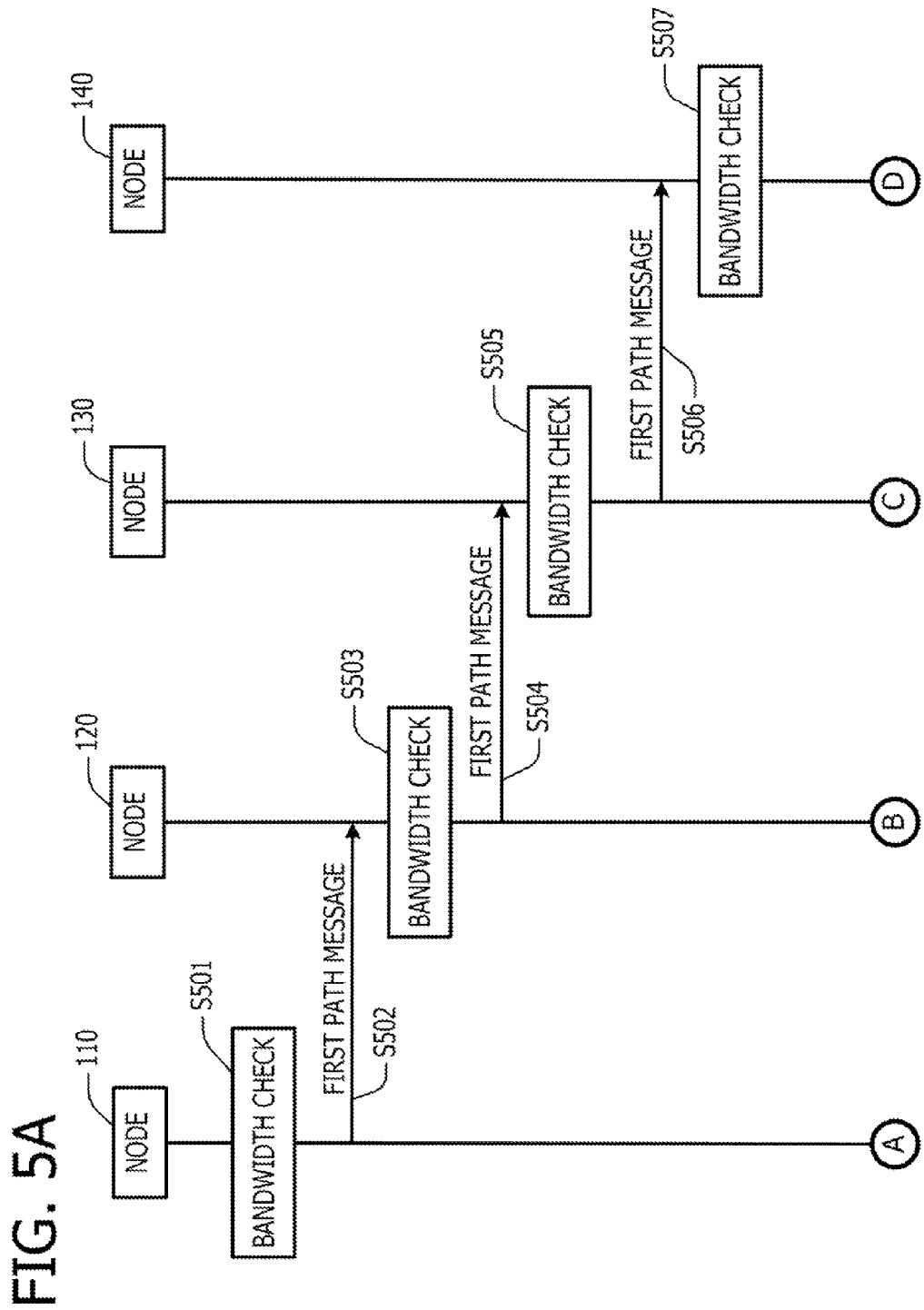

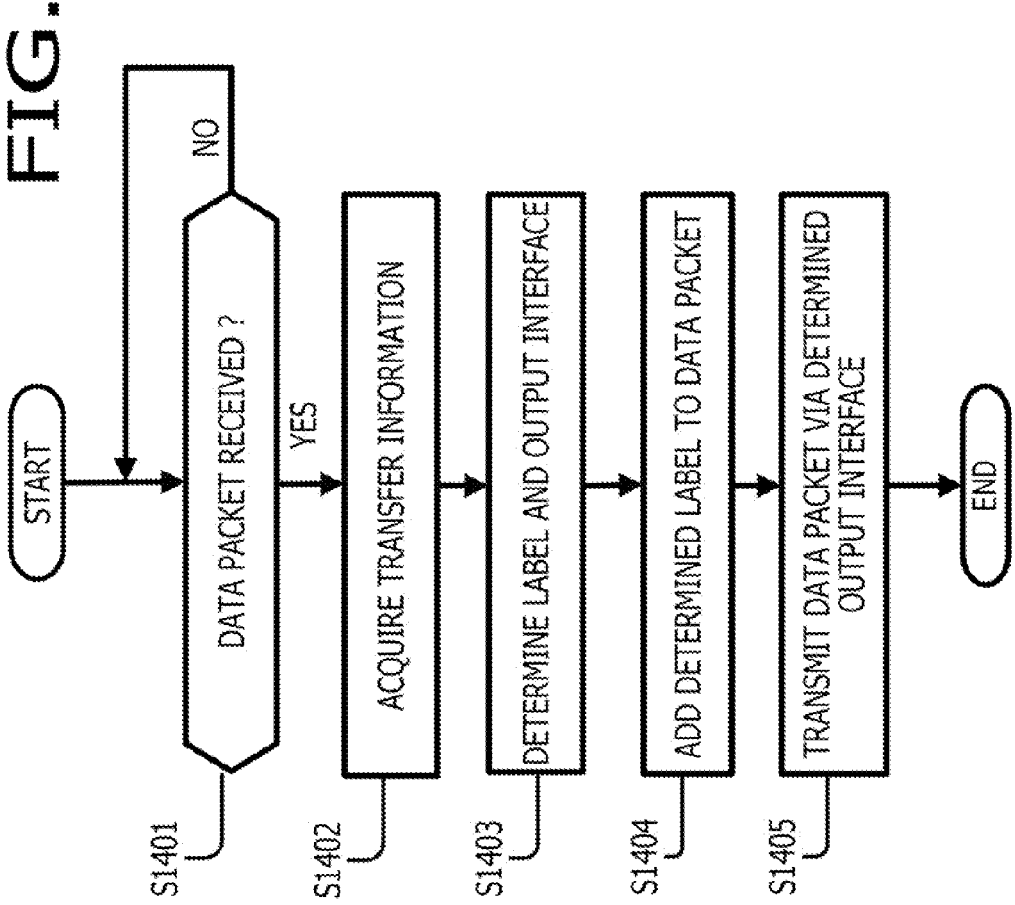

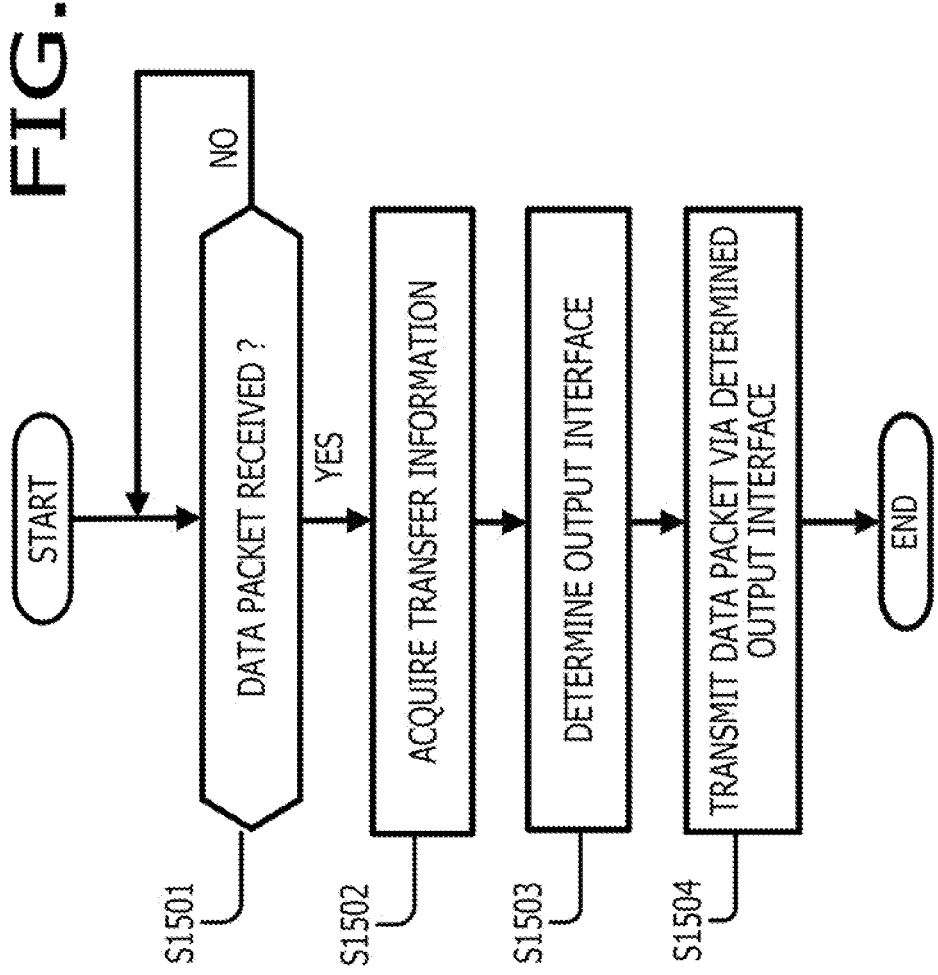

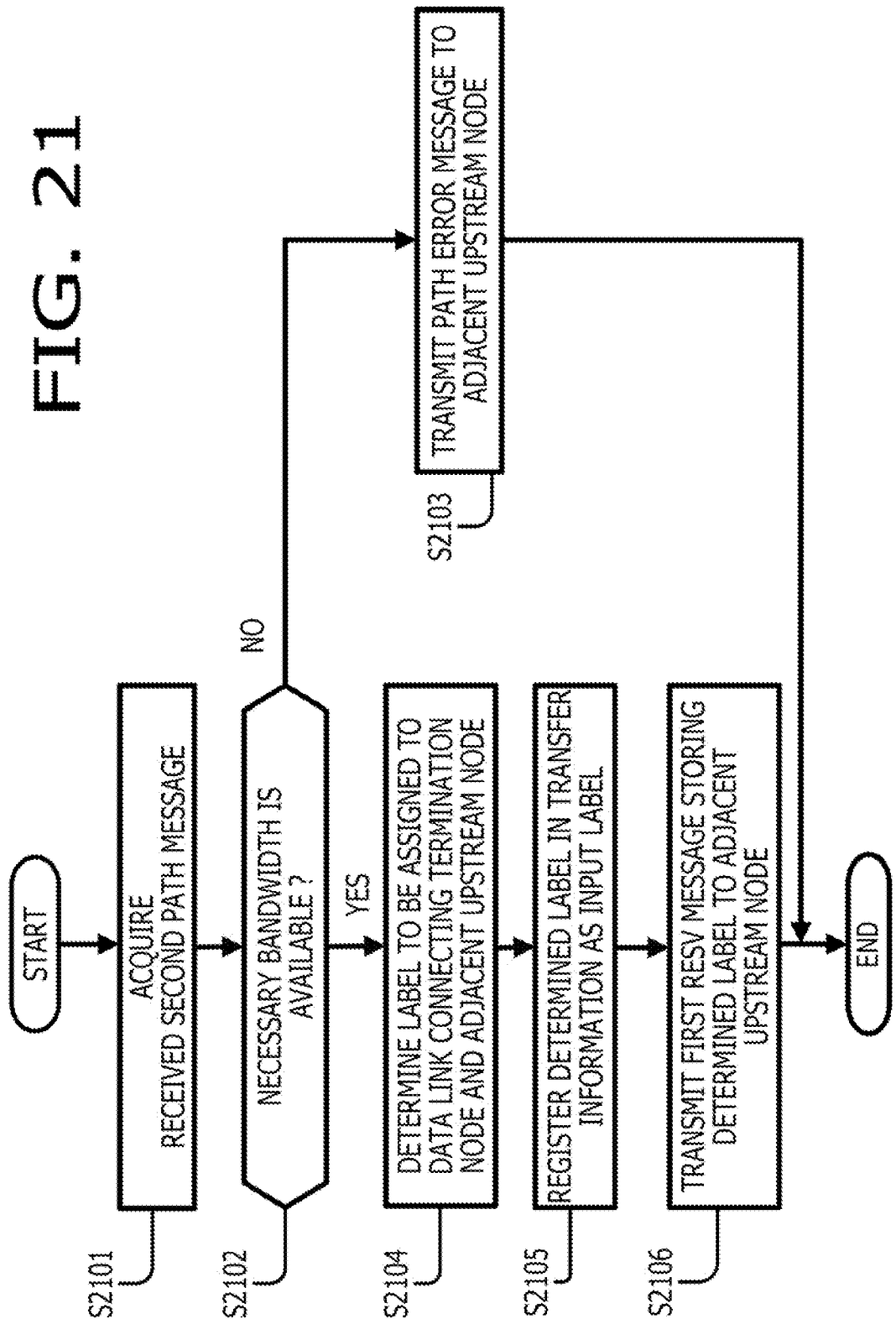

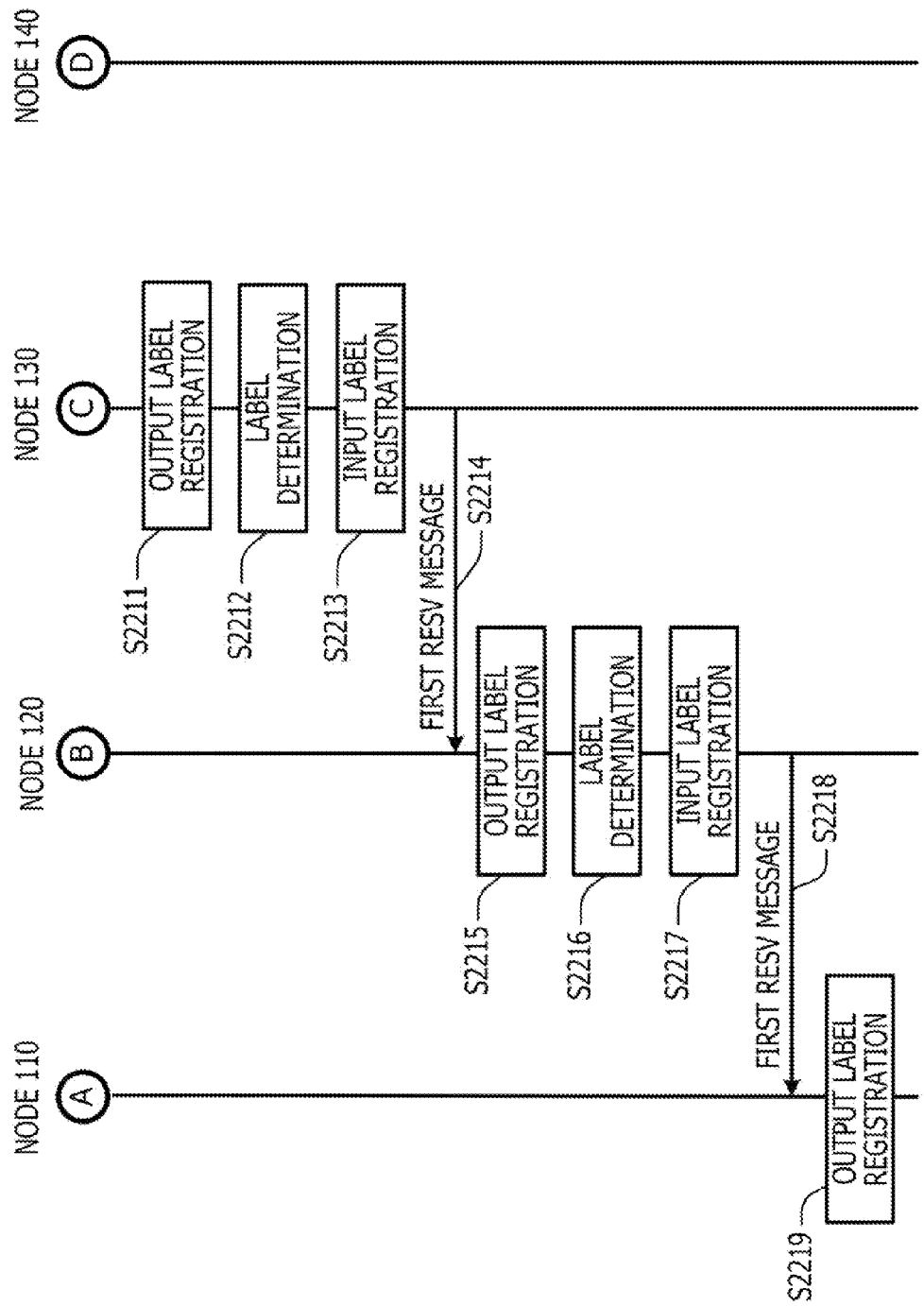

SYSTEM AND METHOD FOR ESTABLISHING A COMMUNICATION PATH USING LABELS

CROSS-REFERENCE TO RELATED APPLICATION

This application is based upon and claims the benefit of priority of the prior Japanese Patent Application No. 2010-120462, filed on May 26, 2010, the entire contents of which are incorporated herein by reference.

FIELD

The present invention relates to a system and method for establishing a communication path using labels.

BACKGROUND

In these latter days, a MPLS (Multiprotocol Label Switching) has been used as a data-carrying mechanism that allows, by incorporating a label switching concept into an IP network, more high-speed and flexible routing than conventional IP routing that is performed using an IP address. For example, the related technology is disclosed in Japanese Laid-open Patent Publication No. 2007-235579.

In the conventional IP routing, a Hop-by-Hop method is employed in which a destination to which a data packet is transferred is determined by comparing a destination IP address of the data packet received by each node, with each of entries of a routing table held in the each node. According to this method, processing load of each node may become high, thereby causing bottleneck in packet transfer performance. Further, traffic congestion in a network may occur since processing for route selection is performed on all the data packets passing through the each node.

In a MPLS, for example, a short fixed-length identifier (for example, 20 bits in length) called a label is used instead of an IP address, and each of nodes (routers) determines a route to which a packet is to be transferred, based on the label. Further, the each of nodes stores transfer information in which each of label values is associated with one of destination addresses so that the each node determines a destination address to which a packet having the corresponding label value is to be transferred, based on the transfer information. In this way, a communication path passing through a given route is established by beforehand setting transfer information for each of nodes (routers) positioned along a communication path. Recently, a service in which a communication path is being established between required points for a required time period according to a request from an end user has been under consideration, so as to make the best use of the feature of MPLS that allows dynamically establishing a communication path passing through an arbitrary given route.

In a MPLS, when registering transfer information in each node, label information is exchanged between adjacent nodes, based on a signaling protocol such as an RSVP (Resource reSerVation Protocol). According to an RSVP, for example, a LSP (Label Switch Path) is established, triggered by a request from an origination node positioned at an end of the LSP to be established, using an on-demand ordered LSP controlling method in which a label value is sequentially assigned to a data link connecting each pair of adjacent nodes along the LSP in the direction from a termination node positioned at the other end of the LSP toward the origination node.

However, according to the above mentioned related arts, there exists a problem that it takes time to establish a communication path. For example, in an RSVP, label assignment processing is sequentially performed on a node after the node has received assignment notification (for example, a RESV message) from a adjacent downstream node that is defined as an adjacent node in the downstream direction from the origination node toward the termination node along the communication path. For this reason, a processing time required for distributing labels and establishing a communication path is linearly increases in proportion to the number of nodes passed by the communication path passes (a hop count).

In recent years, a hop count needed for transferring a data packet in a network has been increased with increasing scale of the network, thereby increasing a processing time required for establishing a communication path. Meanwhile, in a field where real-time performance is required, such as a TV broadcast system, introduction of MPLS technology allowing transmission of large volume of data has been promoted, and speeding-up of path establishment has been required.

SUMMARY

According to an aspect of an embodiment, there is provided a system and method for establishing a communication path in which a data packet is transferred using labels each being assigned to a data link connecting each pair of adjacent nodes along the communication path. The communication path is established by a sequence of nodes positioned along the communication path. The sequence of nodes includes an origination node positioned at an end of the communication path, a termination node positioned at the other end of the communication path, and one or more relay nodes positioned between the origination node and the termination node along the communication path. The origination node is configured to create a path message for requesting establishment of the communication path, and to provide each of downstream nodes with the path message where the path message includes route information identifying a sequence of nodes and interfaces along the communication path, and the downstream nodes are nodes positioned in a downstream direction from the origination node towards the termination node along the communication path. The each of the downstream nodes is configured to perform, on a predetermined condition, label assignment processing for assigning a label to a data link connecting the each of the downstream nodes and an adjacent upstream node where the adjacent upstream node is a node adjacent to the each of the downstream nodes in an upstream direction from the termination node toward the origination node along the communication path. The each of the one or more relay nodes performs the label assignment processing, upon being provided with label assignment request information for requesting the label assignment processing where the label assignment request information is provided for the each of the one or more relay nodes without depending on the label assignment processing performed on other nodes of the downstream nodes, so that the label assignment processing is concurrently performed on the each of the downstream nodes.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 2C is a diagram illustrating an example of transfer information held in node 130, according to an embodiment;

FIG. 2D is a diagram illustrating an example of transfer information held in node 140, according to an embodiment;

FIGS. 5A, 5B are diagrams illustrating an example of an operational sequence for establishing a communication path, according to a first embodiment;

FIG. 14 is a diagram illustrating an example of data transfer processing performed by a relay node, according to a first embodiment;

FIG. 15 is a diagram illustrating an example of data transfer processing performed by a termination node, according to a first embodiment;

FIG. 21 is a diagram illustrating an example of a flowchart for signaling processing that is performed by a termination node, according to a second embodiment;

FIGS. 22A, 22B are diagrams illustrating an example of an operational sequence for establishing a communication path, according to a third embodiment;

DESCRIPTION OF EMBODIMENTS

Figure 1:
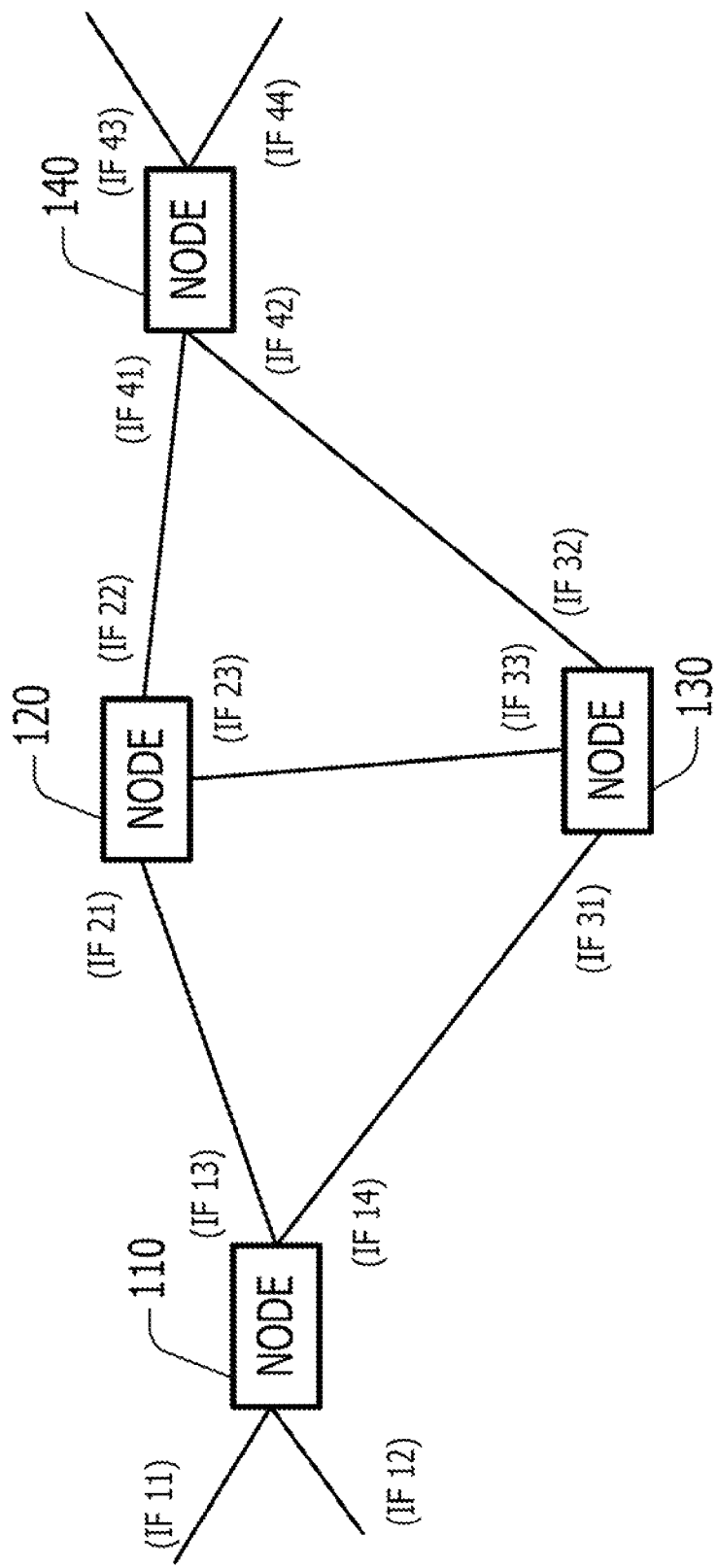
FIG. 1 is a diagram illustrating a configuration example of a communication system, according to an embodiment.

FIG. 1 is a diagram illustrating a configuration example of a communication system, according to a first embodiment. In FIG. 1, communication system 100 according to the first embodiment, for example, performs an on-demand ordered control of LSP. For example, communication system 100 establishes a communication path by assigning a label to a data link connecting each pair of adjacent nodes along the communication path so that data packets are transferred between the each pair of adjacent nodes via the data link using the label assigned to the data link. As depicted in FIG. 1, communication system 100 includes, for example, nodes 110, 120, 130, and 140. In FIG. 1, IFs 11 to 14, IFs 21 to 23, IFs 31 to 33, IFs 41 to 44 indicate input/output interfaces (for example, addresses) provided for nodes 110, 120, 130, 140, respectively, via which data packets are to be transferred along a communication path to be established.

Node 110 includes IFs 11 to 14 as input/output interfaces. IFs 11, 12 may be connected to other nodes that are not depicted in FIG. 1. IFs 13, 14 are connected to nodes 120, 130, respectively. Node 120 includes IFs 21 to 23 as input/output interfaces. IFs 21, 22, 23 are connected to nodes 110, 140, 130, respectively.

Node 130 includes IFs 31 to 34 as input/output interfaces. IFs 31, 32, 33 are connected to nodes 110, 140, 120, respectively. Node 140 includes IFs 41 to 44 as input/output interfaces. IFs 41, 42 are connected to nodes 120, 130, respectively. IFs 43 to 44 may be connected to other nodes that are not depicted in FIG. 1.

Figure 2A:
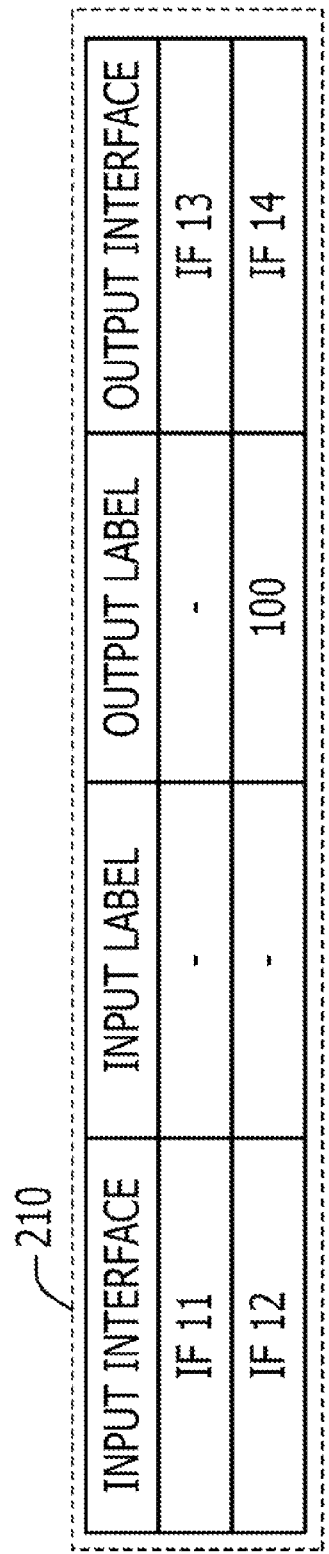
FIG. 2A is a diagram illustrating an example of transfer information held in node 110, according to an embodiment.

FIG. 2A is a diagram illustrating an example of transfer information stored in node 110, according to an embodiment. For example, node 110 may be configured to store transfer information 210 in a memory as depicted in FIG. 2A. In transfer information 210, input interface IF 11 is associated with output interface IF 13. Therefore, upon receiving a data packet from IF 11, node 110 transfers the received data packet via IF 13 to node 120.

Further, in transfer information 210, input interface IF 12 is associated with a combination of output label "100" and output interface IF 14. In the case, upon receiving a data packet from IF 12, node 110 adds label value "100" to the received data packet, and transfers the data packet labeled with "100" via IF 14 to node 130.

Figure 2B:
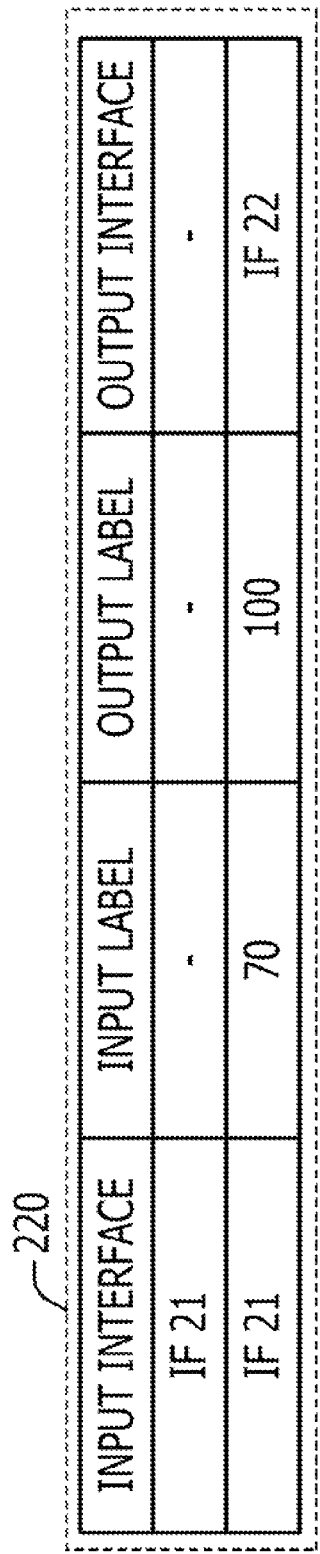
FIG. 2B is a diagram illustrating an example of transfer information held in node 120, according to an embodiment.

FIG. 2B is a diagram illustrating an example of transfer information stored in node 120, according to an embodiment. For example, node 120 may be configured to store transfer information 220 in a memory, as depicted in FIG. 2B. In transfer information 220, a combination of input interface IF 21 and input label "none" is associated with neither an output label nor an output interface. Therefore, upon receiving data packet from IF 21, node 120 does not transfer the received data packet. In the case, for example, node 120 discards the received data packet.

Further, in transfer information 220, input interface IF 21 and input label "70" are associated with a combination of output label "100" and output interface IF 22. In the case, upon receiving data packet labeled with "70" via IF 21, node 110 assigns label "100" to the received data packet, and transfers the data packet labeled with "100" via IF 22 to node 140.

FIG. 2C is a diagram illustrating an example of transfer information stored in node 130, according to an embodiment. For example, node 130 may be configured to store transfer information 230 in a memory, as depicted in FIG. 2C. In transfer information 230, a combination of input interface IF 31 and input label "100" is associated with a combination of output label "200" and output interface IF 32. Therefore, upon receiving a data packet labeled with "100" via IF 31, node 130 adds label "200" to the received packet, and transfers the data packet labeled with "200" via IF 32 to node 140.

Further, in transfer information 230, a combination of input interface IF 32 and input label "20" is associated with a combination of output label "40" and output interface IF 33. In the case, upon receiving a data packet labeled with "20" via IF 32, node 130 adds label "40" to the received data packet, and transfers the data packet labeled with "40" via IF 33 to node 120.

FIG. 2D is a diagram illustrating an example of transfer information stored in node 140, according to an embodiment. For example, node 140 may be configured to store transfer information 240 in a memory, as depicted in FIG. 2D. In transfer information 240, a combination of input interface IF 41 and input label "100" is associated with output interface IF 43. Therefore, upon receiving a data packet labeled with "100" via IF 41, node 140 transmits the received data packet via IF 43 to a node not depicted in FIG. 1, without adding a label to the received data packet.

Further, in transfer information 240, a combination of input interface IF 42 and input label "200" is associated with output interface IF 44. In the case, upon receiving a data packet labeled with "200" via IF 42, node 140 transmits the data packet via IF 44 to a node not depicted in FIG. 1, without adding a label to the received data packet.

Figure 3:
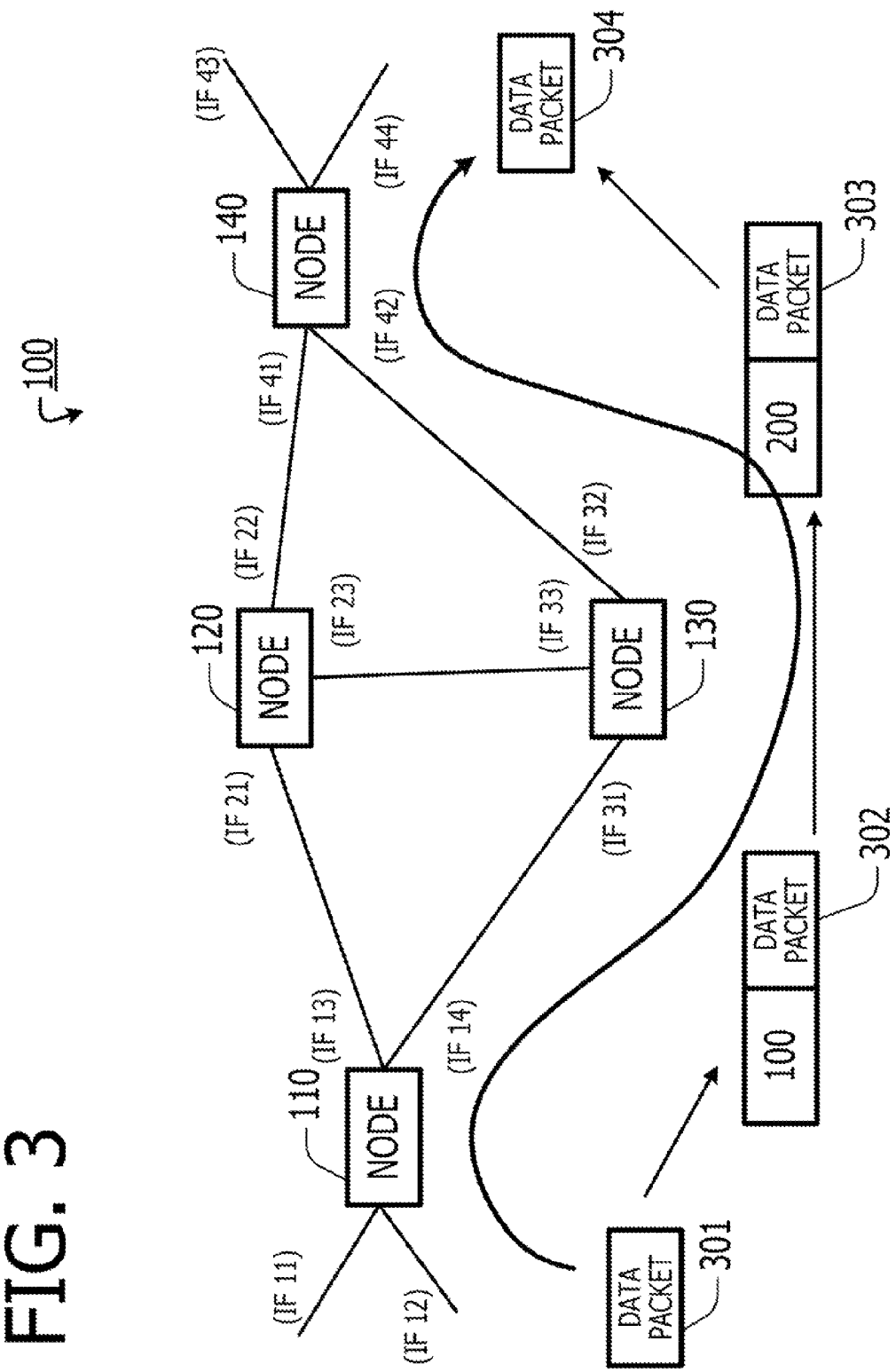
FIG. 3 is a diagram illustrating an example of a transfer flow of a data packet, according to an embodiment.

FIG. 3 is a diagram illustrating an example of transfer flow of a data packet, according to an embodiment. A communication path may be configured to pass through a sequence of nodes including an origination node, one or more relay nodes, and a termination node, where the origination node is a node positioned at an end of the communication path, the termination node is a node positioned at the other end of the communication path, and each of the one or more relay nodes is a node positioned between the origination node and the termination node along the communication path. Hereinafter, nodes that are passed by a communication path to be established and constituting the communication path will be expressed as "nodes along a communication path". In the example depicted in FIG. 3, it is assumed that a communication path passing through nodes 110, 130, and 140 is beforehand established and four pieces of transfer information 210, 230, and 240 have been registered in nodes 110, 130, and 140, respectively. In the case, node 110 becomes an origination node, node 130 becomes one of one or more relay nodes, and node 140 becomes a termination node.

In the example of FIG. 3, data packet 301 is input to node 110 via IF 12. Then, node 110 recognizes that node 110 is an origination node that is positioned an end of a communication path to be established, based on transfer information 210 (as depicted in FIG. 2A) in which output label "100" is set for output interface IF 14, whereas any input label is not set for input interface IF 12 associated with the output interface IF 14. Therefore, upon receiving data packet 301 via IF 12, node 110 adds label "100" to the received data packet 301 to generate data packet 302, and transfers the generated data packet 302 labeled with "100" via IF 14 to node 130.

Node 130, upon receiving the data packet 302 via IF 31 from node 110, recognizes that node 130 is a relay node based on transfer information 230 (as depicted in FIG. 2C) in which not only input label "100" is set for input interface IF 31 but also output label "200" is set for output interface IF 32 associated with the input interface IF 31. Node 130 removes label "100" from data packet 302 received from Node 110, and newly adds label "200" to data packet 302 to generate data packet 303. Then, node 130 transfers data packet 303 labeled with "200" via IF 32 to node 140. Node 140, upon receiving data packet 303 via IF 42 from node 130, recognizes that node 140 is a termination node that is positioned at the other end of a communication path to be established, based on transfer information 240 (as depicted in FIG. 2D) in which input label "200" is set for input interface IF 42, whereas an output label is not set for output interface IF 44 associated with the input interface IF 22. Therefore, node 140 removes label "200" from data packet 303 received from node 130 to generate data packet 304, and transfers the generated data packet 304 from which label "200" has been removed, via IF 44, to another node not depicted in FIG. 3.

As described above with reference to FIG. 3, a communication path passing through nodes 110, 130, and 140 is established based on transfer information 210, 230, and 240. In the established communication path, data transfer between nodes 110 and 130 is performed using label "100" assigned to a data link connecting nodes 110 and 130, and data transfer between nodes 130 and 140 is performed using label "200" assigned to a data link connecting nodes 130 and 140.

Figure 4:
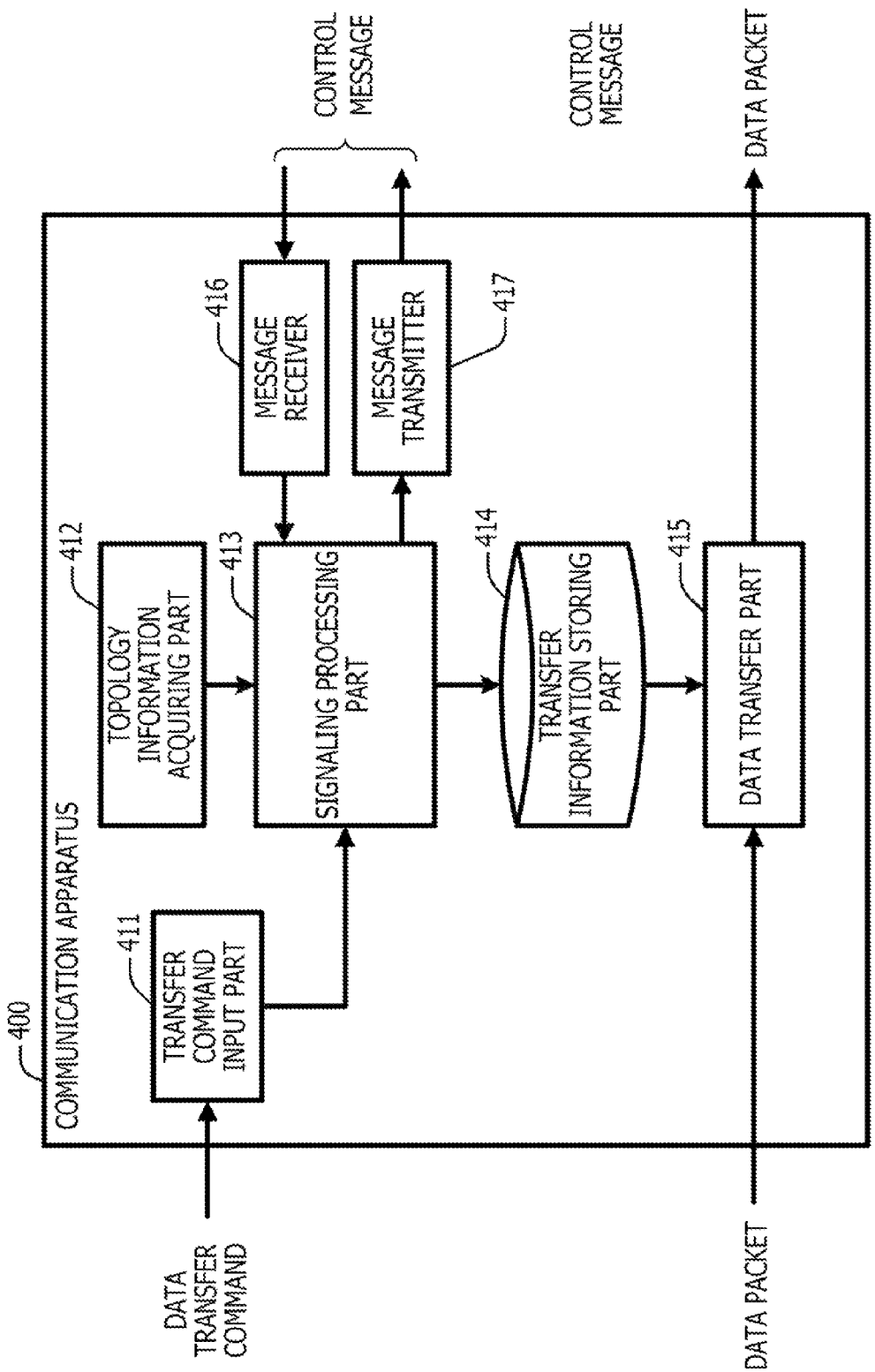
FIG. 4 is a diagram illustrating a configuration example of a communication apparatus, according to an embodiment.

FIG. 4 is a diagram illustrating a configuration example of a communication apparatus, according to an embodiment. Communication apparatus 400 of FIG. 4 according to an embodiment may be applicable to each of nodes 110, 120, 130, and 140 as depicted in FIG. 1. Here, description will be given of a communication apparatus applied to node 110, as a representative example. However, a communication apparatus applied to the other nodes 120, 130, or 140, may be configured in the similar manner, and the descriptions thereof will be omitted here.

In the following description, the direction from an origination node to a termination node along a communication path is referred to as "a downstream direction", and the direction from the termination node to the origination node along the communication path is referred to as "an upstream direction". When a first node is given along a communication path, one or more second nodes that are positioned in the downstream direction from the first node along the communication path are referred to as "a downstream node" of the first node or "downstream nodes" of the first node. Further, a downstream node adjacent to the first node is referred to as "an adjacent downstream node" of the first node. In the similar manner, when a first node is given along a communication path, one or more second nodes that are positioned in the upstream direction from the first node along the communication path are referred to as "an upstream node" of the first node or "upstream nodes" of the first node. Further, downstream nodes of the origination node will be also expresses simply as "downstream nodes".

As depicted in FIG. 4, communication apparatus 400 may be configured to include transfer command input part 411, topology information acquiring part 412, signaling processing part 413, transfer information storing part 414, data transfer part 415, message receiver 416, and message transmitter 426.

Transfer command input part 411 may be configured to input a data transfer command that is input by, for example, a user operating communication apparatus 400. Data transfer command may be configured to include, for example, route information identifying a sequence of nodes and interfaces along a communication path to be established, via which data packets are to be transferred, and bandwidth information indicating a bandwidth needed for transferring data packets along the communication path. Transfer command input part 411 sends the data transfer command to signaling processing part 413.

Topology information acquiring part 412 may be configured to acquire topology information of a network, for example, topology information of the network indicated by communication system 100 depicted in FIG. 1. Topology information acquiring part 412 may be configured to acquire topology information, for example, using a routing protocol such as an OSPF (Open Shortest Path First). Topology information acquiring part 412 sends the acquired topology information to signaling processing part 413.

Signaling processing part 413 may be configured to perform signaling processing via message receiver 416 and message transmitter 417, based on the data transfer command received from transfer command input part 411 and the topology information received from topology information acquiring part 412. For example, signaling processing part 413 performs RSVP processing, such as allocating a bandwidth needed for transferring data packets along a communication path to be established, and assigning a label to a data link connecting the communication apparatus 400 and an adjacent upstream node thereof, by exchanging control messages between the communication apparatus 400 and other nodes.

For example, signaling processing part 143 exchanges label information between the communication apparatus 400 and an adjacent upstream node thereof via message receiver 416 and message transmitter 417. Further, signaling processing part 143 performs update processing on transfer information 210 stored in transfer information storing part 414, based on the label information that was exchanged between communication apparatus 400 and other nods within communication system 100. Transfer information storing part 414 holds the updated transfer information 210.

Data transfer part 415 may be configured to transfer data packets that have been transmitted from other nodes. For example, data transfer part 415 receives a data packet that has been transmitted from other node, and transfer the received data packet, using a label added to the received data packet, based on transfer information 210 stored in transfer information storing part 414.

Topology information acquiring part 412 depicted in FIG. 4 may be implemented, for example, using computing means such as a DSP (Digital Signaling Processor). Signaling processing part 413 and data transfer part 415 may be implemented, for example, using computing means (such as a DSP) and communication interface for transmitting data packets. Transfer information storing part 414 may be implemented using various types of memories.

Message receiver 416 may be configured to receive a control message for performing signaling processing from other nodes along a communication path to be established. Message transmitter 417 may be configured to transmit a control message for performing signaling processing to other nodes along the communication path.

Figure 5B:
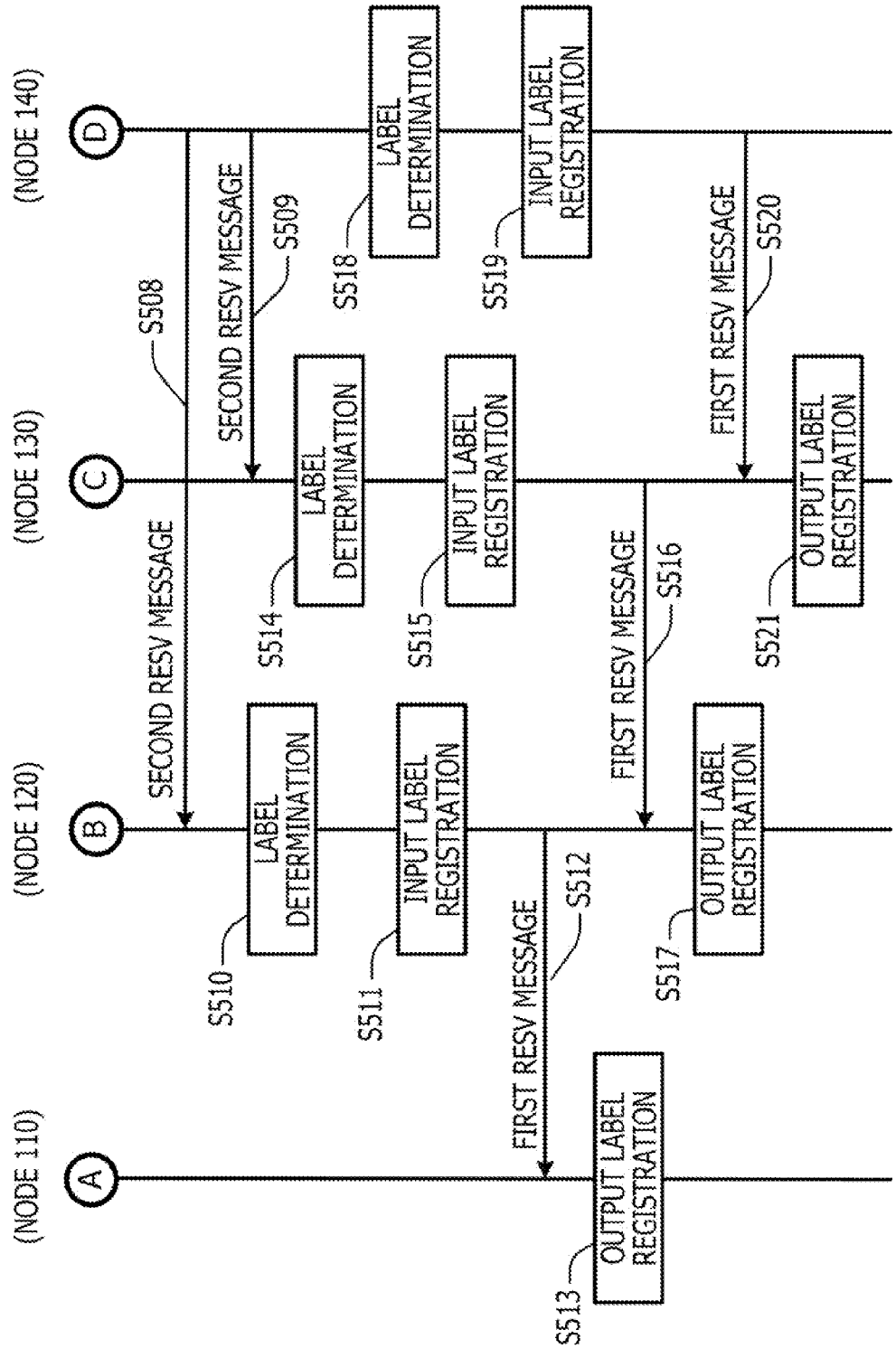

FIGS. 5A, 5B are diagrams illustrating an example of an operational sequence for establishing a communication path, according to a first embodiment. In FIGS. 5A, 5B, it is assumed that a data transfer command for requesting data transfer along a communication path passing through a sequence of nodes 110, 120, 130, and 140. In the case, node 110 becomes an origination node, nodes 120, 130 become relay nodes, and node 140 becomes a termination node.

In operation S501, origination node 110 performs bandwidth check processing in which, for example, it is checked whether origination node 110 has an available bandwidth needed for data transfer requested by a data transfer command or not. In FIGS. 5A, 5B, description will be given of the case where each node has an available bandwidth needed for the data transfer.

In operation S502, origination node 110 creates a first path message (which will be described later with reference to FIG. 6) for requesting each node to allocate a bandwidth needed for the data transfer requested by the data transfer command. Here, the first path message is configured to include bandwidth information and route information. The bandwidth information indicates a bandwidth needed for transferring data packets along a communication path to be established, and the route information identifies a sequence of nodes and interfaces along a communication path to be established, via which data packets are to be transferred. In the example of FIGS. 5A, 5B, the route information identifies a sequence of nodes 110, 120, 130, and 140, and interfaces via which data packets are to be transferred. Origination node 110 transmits the created first path message to adjacent downstream node 120 identified by the route information.

Upon receiving the first path message, node 120 recognizes that node 110 is a relay node based on the route information stored in the received first path message. Further, node 120 recognizes that node 110 is an adjacent upstream node, and node 130 is an adjacent downstream node, based on the route information stored in the received first path message.

Figure 6:
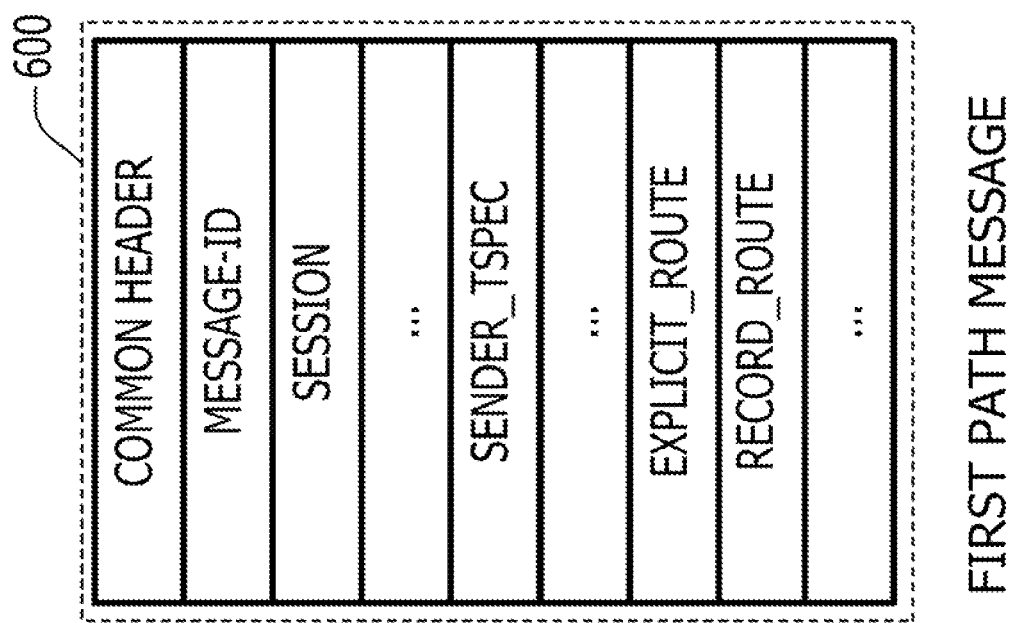
FIG. 6 is a diagram illustrating an example of a first path message, according to a first embodiment.

In operation S503, node 120 performs bandwidth check processing based on bandwidth information stored in the received first path message. Here, the bandwidth information indicates a bandwidth needed for transferring data packets along a communication path to be established, and, for example, is stored in a "SENDER_TSPEC" field of the received first path message as depicted in FIG. 6 which will be described later.

In operation S504, node 120 transfers the received first path message to adjacent downstream node 130. Here, node 120 adds, to the route information of the first path message, destination interface information identifying an output interface via which the first path message is to be transmitted, in addition to information identifying an input interface via which the first path message was received. This allows a termination node to transmit a control message directly to the output interface of node 120 using the destination interface information identifying the output interface as a destination address of the control message.

Upon receiving the first path message, node 130 recognizes that node 130 is a relay node, based on the route information included in the received first path message. Further, node 130 recognizes that node 120 is an adjacent upstream node, and node 140 is an adjacent downstream node, based on the route information included in the received first path message.

In operation S505, node 130 performs bandwidth check processing based on the bandwidth information stored in the received first path message.

In operation S506, node 130 transfers the received first path message to adjacent downstream node 140. Here, node 130 adds, to the first path message to be transmitted, destination interface information identifying an output interface via which the first path message is to be transmitted, in addition to information identifying an input interface via which the first path message was received.

In operation S506, upon receiving a first path message from node 130, node 140 recognizes that node 140 is a termination node, based on the route information included in the received first path message. Further, node 140 recognizes that node 130 is an adjacent upstream node, based on the route information included in the received first path message.

In operation S507, node 140 performs bandwidth check processing based on the bandwidth information contained in the received first path message.

In operation S508, node 140 creates a second RESV message (which will be described later with reference to FIG. 8) including label assignment request information for requesting a node to perform label assignment processing in which a label is assigned to a data link connecting adjacent nodes along a communication path to be established. Here, the second RESV message is different from a first RESV message (which will be described later with reference to FIG. 7) in that the second RESV message does not store label information that was determined by termination node 140, but includes label assignment request information for requesting a relay node to perform the label assignment processing. Then termination node 140 transmits the created second RESV message directly to relay node 120 before performing the label assignment processing on termination node 140, as depicted in FIG. 5B. Here, termination node 140 may be configured to acquire destination interface information from the received first path message, and to transmit the created second RESV message directly to node 120, by using, as a destination address of the second RESV message, the acquired destination interface information identifying the output interface of node 120 via which the first path message was transmitted, where the destination interface information has been stored in the first path message in operation S504.

In the similar manner, termination node 140 transmits the second RESV message directly to relay node 130 before node 140 performs label assignment processing on the node 140, by using, as a destination address of the second RESV message, destination interface information identifying the output interface of node 130 via which the first path message was transmitted, where the destination interface information has been stored in the first path message in operation S506.

In this way, termination node 140 may transmit second RESV messages concurrently to both nodes 120 and 130 so that nodes 120 and 130 concurrently perform label assignment processing without depending on label assignment processing performed on other nodes along the communication path.

In operation S510, upon receiving the second RESV message that was transmitted in operation S508, relay node 120 determines a label to be assigned to a data link connecting node 120 and adjacent upstream node 110. Then, node 120 registers the label determined in operation S510 in transfer information 220 held in transfer information storing part 414, as an input label to be used for transferring data packets between node 120 and adjacent upstream node 110.

In operation S512, node 120 transmits a first RESV message in which the label determined in operation S510 is stored, to adjacent upstream node 110.

In operation S513, upon receiving the second RESV message, node 110 registers the label stored in the received second RESV message in transfer information 210 held in transfer information storing part 414, as an output label to be used for transferring data packets between node 110 and adjacent downstream node 120.

In operation S514, upon receiving the second RESV message that was transmitted in operation S509, relay node 130 performs label determination processing for determining a label to be assigned to a data link connecting node 130 and adjacent upstream node 120. Next, node 130 registers the label determined in operation S514 in transfer information 220 held in transfer information storing part 414, as an input label to be used for transferring data packets between node 130 and adjacent upstream node 120.

In operation S516, relay node 130 transmits a first RESV message in which the label determined in operation S514 is stored, to adjacent upstream node 120.

In operation S517, upon receiving the first RESV message from adjacent downstream node 130, relay node 120 registers the label stored in the received second RESV message that was transmitted in operation S516, in transfer information 220 held in transfer information storing part 414, as an output label to be used for transferring data packets between nodes 120 and adjacent downstream node 130.

In operation S518, termination node 140 performs label determination processing for determining a label to be assigned to a data link connecting node 140 and adjacent upstream node 130, after transmitting the second RESV messages in operations S508 and S509.

In operation S519, termination node 140 registers the label determined in operation S518, in transfer information 240 held in transfer information storing part 414, as an input label to be used for transferring data packets between node 140 and adjacent upstream node 130.

In operation S520, node 140 transmits a first RESV message storing the label that was determined in operation S518, to adjacent upstream node 130.

In operation S521, upon receiving the first RESV message, node 130 registers the label stored in the received first RESV message, in transfer information 230 held in transfer information storing part 414, as an output label to be used for transferring data packets between node 130 and adjacent downstream node 140, and ends the sequence of operations.

By performing the sequence of operations described above, a label is assigned to each pair of adjacent nodes along a communication path to be established, and the communication path passing through a sequence of nodes 110, 120, 130, and 140 may be established. Further, upon receiving a first path message, termination node 140 transmits a second RESV message including label assignment request information for requesting a node to perform label assignment processing, directly to each of relay nodes 120 and 130, thereby allowing relay nodes 120 and 130 to perform the label assignment processing concurrently without depending on the label assignment processing performed on other nodes. For example, label assignment processing depicted in operations S510 to S512 and label assignment processing depicted in operations S514 to S516 are performed concurrently, thereby reducing a processing time needed for establishing a communication path.

Further, termination node 140 may be configured to perform label assignment processing for assigning a label to a data link connecting termination node 140 and adjacent upstream node 130, after transmitting a second RESV message to relay nodes, thereby allowing the relay nodes and termination node 140 to concurrently perform label assignment processing. For example, label assignment processing in operations S510 to S512, label assignment processing in operations S514 to S516, and label assignment processing in operations S518 to S520 may be performed concurrently without depending on the label assignment processing performed on other nodes. This allows further reducing a processing time needed for establishing a communication path.

FIG. 6 is a diagram illustrating an example of a first path message, according to an embodiment. In FIG. 6, control message 600 indicates a first path message that is transferred from an origination node to a termination node via each of relay nodes along a communication path to be established. First path message 600 may be configured to include, for example, "COMMON HEADER" field, "MESSAGE-ID" field, "SESSION" field, "SENDER_TSPEC" field, "EXPLICIT_ROUTE" field, and "RECORD_ROUTE" field. First path message 600, for example, may be used for requesting each node to establish a communication path, to release the communication path, or to trigger various types of settings.

"COMMON HEADER" field stores header information needed for transmitting first path message 600. "MESSAGE-ID" field stores identification information identifying a type of control message, and, in the case, stores identification information identifying first path message 600. "SESSION" field stores route information identifying a termination node of a communication path to be established. For example, "SESSION" field is configured to store address information of a termination node, which may be used for determining whether a node that has received first path message is a relay node or a termination node. "SENDER_TSPEC" field stores bandwidth information indicating a bandwidth needed for establishing a communication path capable of transferring data packets requested by data transfer command. "EXPLICIT_ROUTE" field stores route information identifying an input interface of each of downstream nodes from the node that has received the first path message, to which first path message 600 is to be transferred.

"RECORD_ROUTE" field stores route information identifying an input interface of each of upstream nodes from the node that has received the first path message, via which first path message 600 was transferred along the communication path to be established. According to the first embodiment, "RECORD_ROUTE" field further stores destination interface information identifying an output interface of each of upstream nodes from the node that has received the first path message, via which first path message 600 was transferred along the communication path to be established.

This allows termination node 140 to acquire the destination interface information identifying output interfaces of relay nodes 120 and 130, via which first path message 600 were transferred, based on the route information stored in "RECORD_ROUTE" field of the received first path message 600. That is, termination node 140 is able to transmit a control message to each of relay nodes using the acquired destination interface information as a destination address of the control message to be transmitted. Here, it is unnecessary for origination node 110 to store information identifying an output interface of the node 110 in the "RECORD_ROUTE" field of first path message 600.

Figure 7:
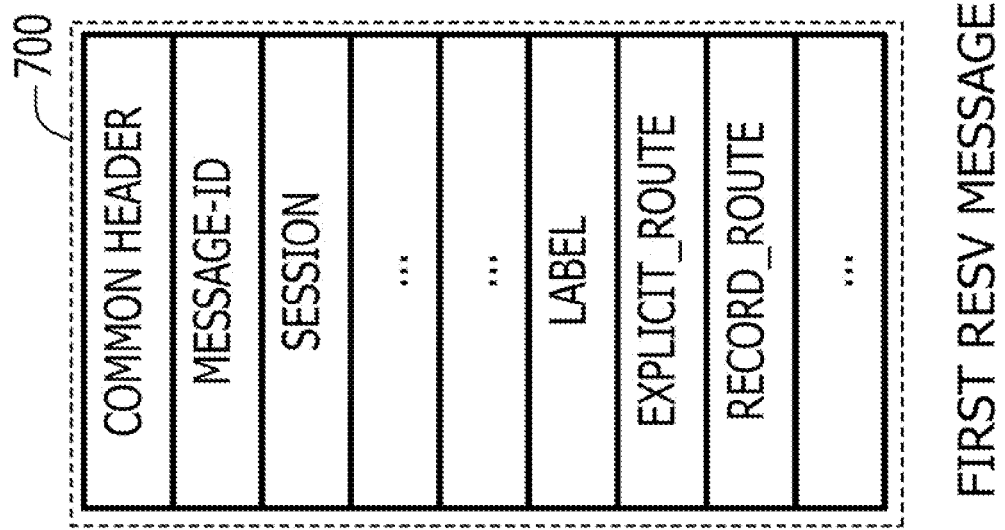
FIG. 7 is a diagram illustrating an example of a first RESV message, according to an embodiment.

FIG. 7 is a diagram illustrating an example of a first RESV message, according to an embodiment. In FIG. 7, control message 700 indicates a first RESV message that is transferred from a termination node to an origination node via each of relay nodes along a communication path to be established in communication system 100. First RESV message 700 may be configured to include, for example, a "COMMON HEADER" field, a "MESSAGE-ID" field, a "SESSION" field, a "LABEL" field, an "EXPLICIT_ROUTE" field, and a "RECORD_ROUTE" field. First RESV message 700 may be used when each of downstream nodes of the origination node informs an adjacent upstream node of a label determined by the downstream node.

The "COMMON HEADER" field stores header information needed for transmitting first RESV message 700. The "MESSAGE-ID" field stores information identifying a type of control message 700, and, in the case, stores information identifying first RESV message 700. The "SESSION" field stores, as route information, information identifying a termination node of a communication path to be established.

"LABEL" field stores information on a label that was determined by an adjacent downstream node, which is to be used for transferring data packets between the adjacent downstream node and the node that has received first RESV message 700. The "EXPLICIT_ROUTE" and "RECORD_ROUTE" fields of RESV message 700 have the meanings similar to those of first path message 600.

Figure 8:
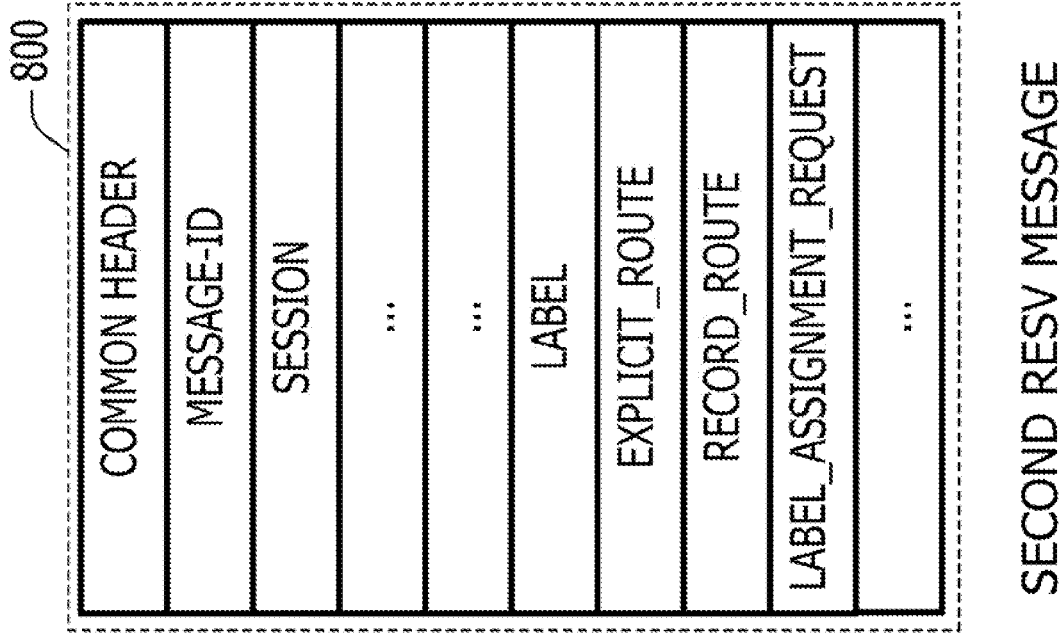
FIG. 8 is a diagram illustrating an example of a second RESV message, according to a first embodiment.

FIG. 8 is a diagram illustrating an example of a second RESV message, according to an embodiment. In FIG. 8, control message 800 indicates an example of a second RESV message that is transmitted from a termination node directly to each of relay nodes along a communication path to be established. Second RESV message 800 may be configured to include, for example, a "COMMON HEADER" field, a "MESSAGE-ID" field, a "SESSION" field, a "LABEL" field, an "EXPLICIT_ROUTE" field, a "RECORD_ROUTE" field, and a "LABEL_ASSIGNMENT_REQUEST" field.

In second RESV message 800, the "COMMON HEADER" field, the "MESSAGE-ID" field, the "SESSION" field, the "EXPLICIT_ROUTE" field, and the "RECORD_ROUTE" field have the meanings similar to those of first RESV message 700. In second RESV message, it is unnecessary for the "LABEL" field to store information on a label that was determined by an adjacent downstream node. However, it is possible to store a specific label, which is not used normally, in the "LABEL" field of second RESV message 800, for a predetermined specific purpose.

In second RESV message 800, the "LABEL_ASSIGNMENT_REQUEST" field is used for storing label assignment request information for requesting a node to perform label assignment processing in which a label is assigned to a data link connecting the node and an adjacent upstream node of the node. Further, since second RESV message 800 is configured to be transmitted from the termination node directly to each of one or more relay nodes, the label assignment request information stored in the second RESV message 800 may be provided for each of the one or more relay nodes concurrently. This allows each of nodes 120 and 130 to concurrently perform the label assignment processing, without waiting for receiving first RESV message 700 storing a label determined by the adjacent downstream node.

In addition to the control messages depicted in FIGS. 6 to 8, as a control message exchanged between nodes, a notification message that is transmitted from an arbitrary node to another arbitrary node may be used. For example, the notification message may be used for notifying each node of error information or for transmitting information between nodes via point-to-point connection.

Figure 9:
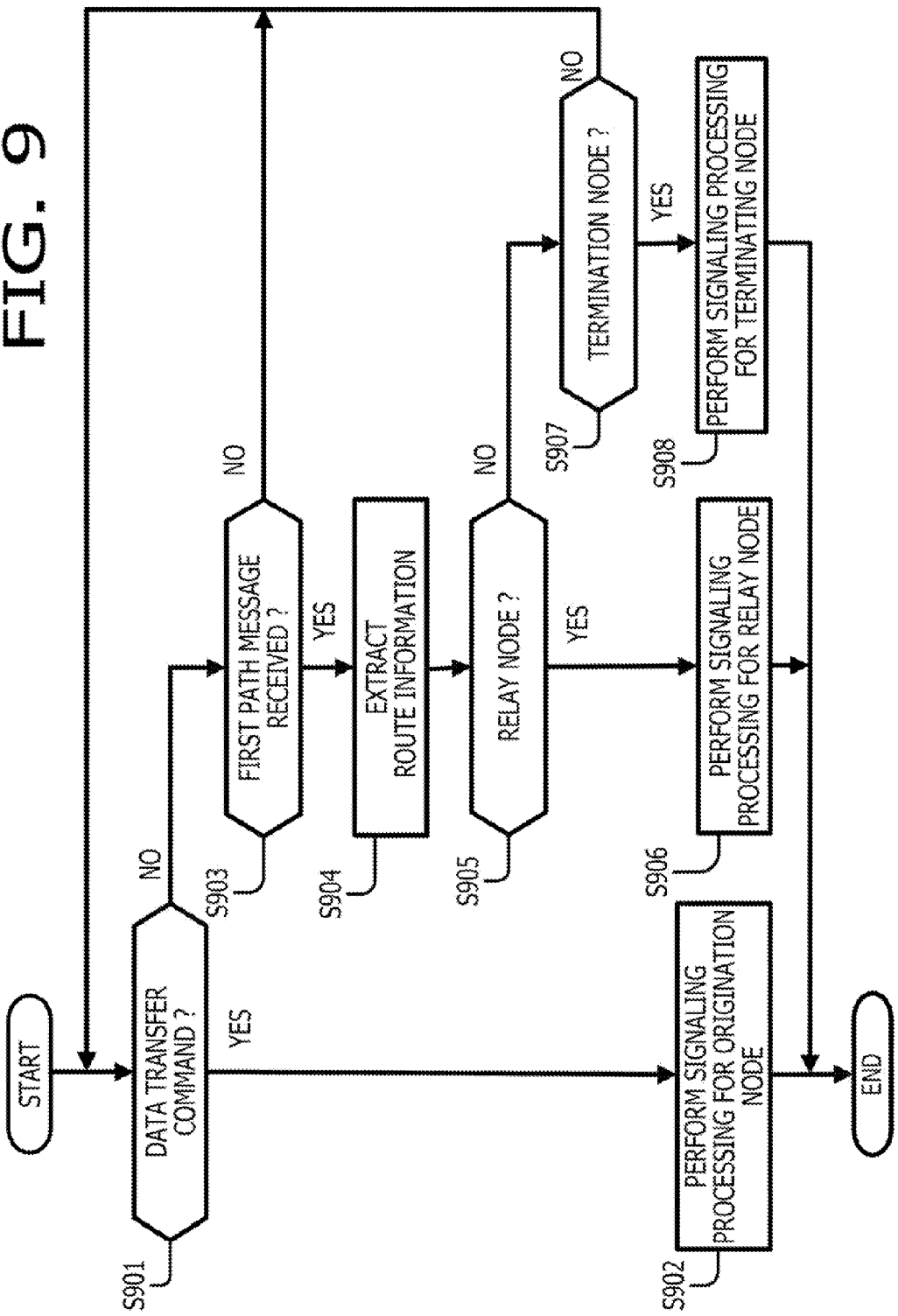
FIG. 9 is a diagram illustrating an example of a flowchart that is performed by each of nodes along a communication path to be established, according to a first embodiment.

FIG. 9 is a diagram illustrating an example of a flowchart that is performed by each of nodes along a communication path to be established, according to a first embodiment. For example, each of nodes 110, 120, 130, and 140, which will be hereinafter also simply referred to as "a node", performs the following sequence of operations for establishing a communication path.

In operation S901, it is determined whether a data transfer command has been input to a node via transfer command input part 411 of the node. When it is determined that the data transfer command has been input (YES in operation S901), the node recognizes that the node is an origination node, and performs signaling processing for an origination node (in operation S902). Then, the node ends the sequence of operations.

When it has been determined that the data transfer command has not been input (NO in operation S901), it is determined whether signaling processing part 413 of the node has received a first path message from an adjacent upstream node (in operation S903). When it is determined that signaling processing part 413 has not received the first path message (NO in operation S903), the node returns to operation S901. Meanwhile, when it is determined that signaling processing part 413 has received the first path message (YES in operation S903), the node extracts route information from the received first path message (in operation S904).

In operation S905, it is determined whether the node is a relay node along a communication path to be established, based on the extracted route information. When it is determined that the node is a relay node (YES in operation S905), the node performs a signaling processing for a relay node (in operation S906), and ends the sequence of operations.

When it is determined that the node is not a relay node (NO in operation S905), it is determined whether the node is a termination node along the communication path, based on the extracted route information (in operation S907). When it is determined that the node is a termination node (YES in operation S907), the node performs signaling processing for a termination node (in operation S908), and ends the sequence of operations. Meanwhile, when it is determined that the node is not a termination node (NO in operation S907), the node returns to operation S901.

In the example of FIG. 5, node 110 recognizes that node 110 is an origination node by performing operation S901 depicted in FIG. 9, and performs a signaling processing for an origination node (which will be described later with reference to FIG. 10). Meanwhile, nodes 120, 130 recognizes that nodes 120, 130 are relay nodes, respectively, by performing operation S905 depicted in FIG. 9, and each of nodes 120, 130 performs signaling processing for a relay node (which will be described later with reference to FIG. 11). Further, node 140 recognizes that node 140 is a terminal node by performing operation S907 depicted in FIG. 9, and performs a signaling processing for a terminal node (which will be described later with reference to FIG. 12).

Figure 10:
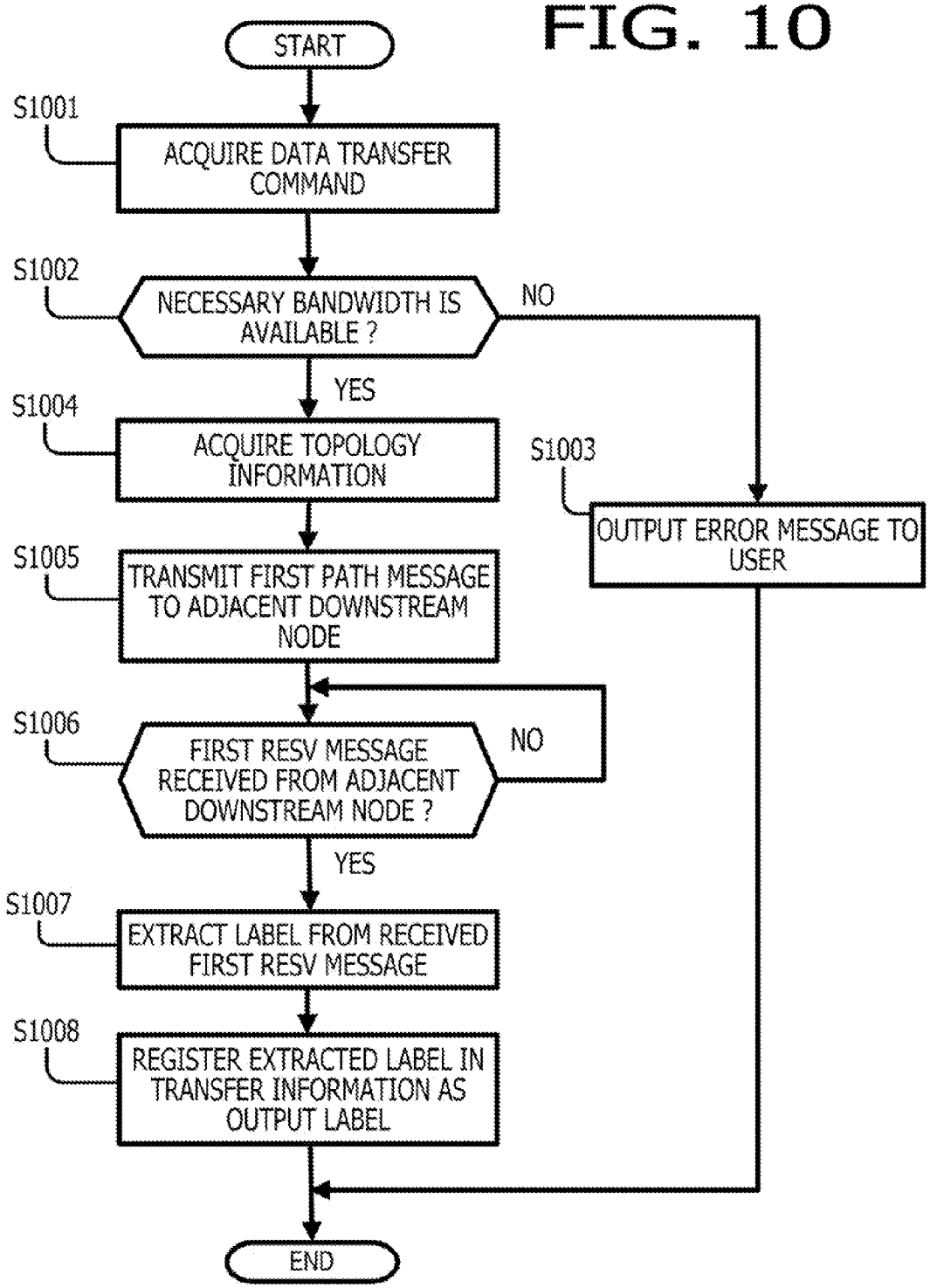
FIG. 10 is a diagram illustrating an example of a flowchart for signaling processing that is performed by an origination node, according to a first embodiment.

FIG. 10 is a diagram illustrating an example of a flowchart for signaling processing that is performed by an origination node, according to a first embodiment. Signaling processing part 413 of origination node 110 performs, for example, the following sequence of operations as signaling processing for an origination node.

In operation S1001, origination node 110 acquires a data transfer command that has been input, in operation S901 of FIG. 9, by a user (for example, an operator of communication apparatus 400).

In operation S1002, it is determined whether origination node 110 has an available bandwidth needed for data transfer requested by the data transfer command.

When it is determined that node 110 does not have an available bandwidth needed for the requested data transfer (NO in operation S1002), origination node 110 notifies a user of an error occurrence by outputting to the user an error message indicating that node 110 is unable to transfer data packets (in operation S1003), and ends the sequence of operations. Here, outputting the error message in operation S1003 may be performed, for example, via a user interface such as a display provided for communication apparatus 400. Meanwhile, when it is determined that node 110 has an available bandwidth needed for the requested data transfer (YES in operation S1002), signaling processing part 413 acquires topology information of a network from topology information acquiring part 412 (in operation S1004).

In operation S1005, signaling processing part 413 creates a first path message as depicted in FIG. 6, based on the data transfer command acquired in operation S1001 and the topology information acquired in operation S1001, and then transmits the created first path message to adjacent downstream node 120.

In operation S1006, it is determined whether a first RESV message is received from adjacent downstream node 120, in response to the first path message that was transmitted in operation S1005, and waits for reception of the first RESV message.

Upon receiving the first RESV message (YES in operation S1006), signaling processing part 413 extracts a label that was determined by adjacent downstream node 120, from the received first RESV message (in operation S1007).

In operation S1008, signaling processing part 413 registers the label extracted in operation S1007 in transfer information 210 held in transfer information storing part 414, as an output label that is to be used for transferring data packets between origination node 110 and adjacent downstream node 120, and then ends the sequence of operations.

Performing the sequence of operations described above allows origination node 110 to transmit a first path message complying with the requested data transfer command, to adjacent downstream node 120, and, at the same time, to register the label determined by adjacent downstream node 120 in transfer information 210 held in transfer information storing part 414.

Figure 11:
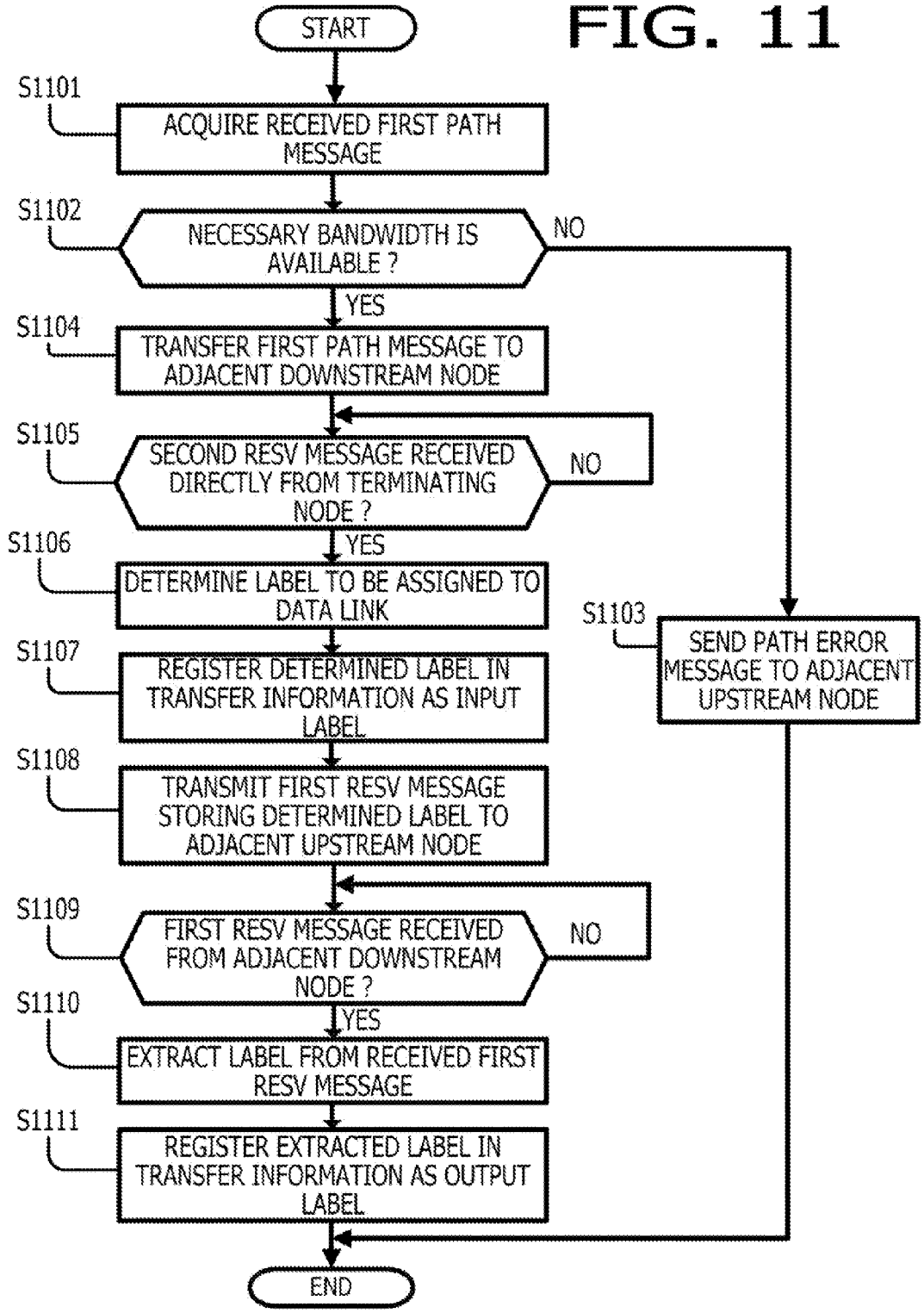
FIG. 11 is a diagram illustrating an example of a flowchart for signaling processing that is performed by a relay node, according to a first embodiment.

FIG. 11 is a diagram illustrating an example of a flowchart for signaling processing that is performed by a relay node, according to a first embodiment. Signaling processing part 413 of relay node 120 performs, for example, the following sequence of operations as signaling processing for a relay node. In FIG. 11, although description will be given of signaling processing performed by relay node 120, signaling processing of relay node 130 may be performed in a manner similar to relay node 120, and description thereof will be omitted here.

In operation S1101, signaling processing part 413 of relay node 120 acquires the first path message received in operation S903 of FIG. 9.

In operation S1102, it is determined whether relay node 120 has an available bandwidth needed for data transfer requested by the first path message acquired in operation S1101. When it is determined that relay node 120 does not have an available bandwidth needed for the requested data transfer (NO in operation S1102), relay node 120 transmits an error message indicating that relay node 120 does not have an available bandwidth needed for the requested data transfer, to an adjacent upstream node, for example, node 110 (in operation S1103). In the case, the error message is transferred between each pair of adjacent nodes in an upstream direction until reaching origination node 110, and error processing is performed in each of nodes that has received the error message.

When it is determined that relay node 120 has an available bandwidth needed for the requested data transfer (YES in operation S1102), relay node 120 transfers the first path message acquired in operation S1101 to the adjacent downstream node, for example, node 130 (in operation S1104). Here, node 120 adds, to the route information of the first path message, destination interface information identifying an output interface via which the first path message is to be transmitted, in addition to information identifying an input interface via which the first path message was received. This allows a termination node to transmit a control message, for example, a second RESV message, directly to the output interface of node 120 using the destination interface information identifying the output interface as a destination address of the control message.

In operation S1105, it is determined whether relay node 120 has received a second RESV message in which label assignment request information, directly from termination node 140 in response to the first path message that was transferred to adjacent downstream node 130 in operation S1104, and relay node 120 waits for receiving the second RESV message directly from termination node 140.

When it is determined that relay node 120 has received the second RESV message including the label assignment request information (YES in operation S1105), relay node 120 performs operations S1106 to S1108, as the label assignment processing for assigning a label to a data link connecting relay node 120 and adjacent upstream node 110.

In operation S1106, relay node 120 determines a label to be assigned to a data link connecting relay node 120 and adjacent upstream node 110.

In operation S1107, relay node 120 registers the label determined in operation S1106, in transfer information 220 held in transfer information storing part 414, as an input label that is to be used for transferring data packets between relay node 120 and adjacent upstream node 110.

In operation S1108, relay node 120 transmits a first RESV message in which the label determined in operation S1106 is stored, to adjacent upstream node 110.

In operation S1109, it is determined whether relay node 120 has received a first RESV message from adjacent downstream node 130 in response to the first path message that was transmitted in operation S1104, and waits for reception of the first RESV message. When it is determined that relay node 120 has received the first RESV message (YES in operation S1109), node 120 extracts the label determined by adjacent downstream node 130, from the received first RESV message (in operation S1110).

In operation S1111, relay node 120 registers the label extracted in operation S1110 in transfer information 220 held in transfer information storing part 414, as an output label that is to be used for transferring data packets between relay node 120 and adjacent downstream node 130, and then ends the sequence of operations.

Performing the sequence of operations described above allows relay node 120 to transfer the first path message received from adjacent upstream node 110 to adjacent downstream node 130, and, at the same time, to perform label assignment processing for assigning a label to a data link connecting relay node 120 and adjacent upstream node 110 upon receiving a second RESV message directly from termination node 140. This allows relay node 120 to perform the label assignment processing, without waiting for completion of label assignment processing that is performed on downstream nodes 130 or 140.

In the similar manner, relay node 130 is able to transfer the first path message received from adjacent upstream node 120 to adjacent downstream node 140, and, at the same time, to perform label assignment processing for assigning a label to a data link connecting node 130 and adjacent upstream node 120 at the time of receiving a second RESV message from termination node 140. This allows relay node 130 to perform the label assignment processing, without waiting for completion of label assignment processing that is performed on termination node 140.

Figure 12:
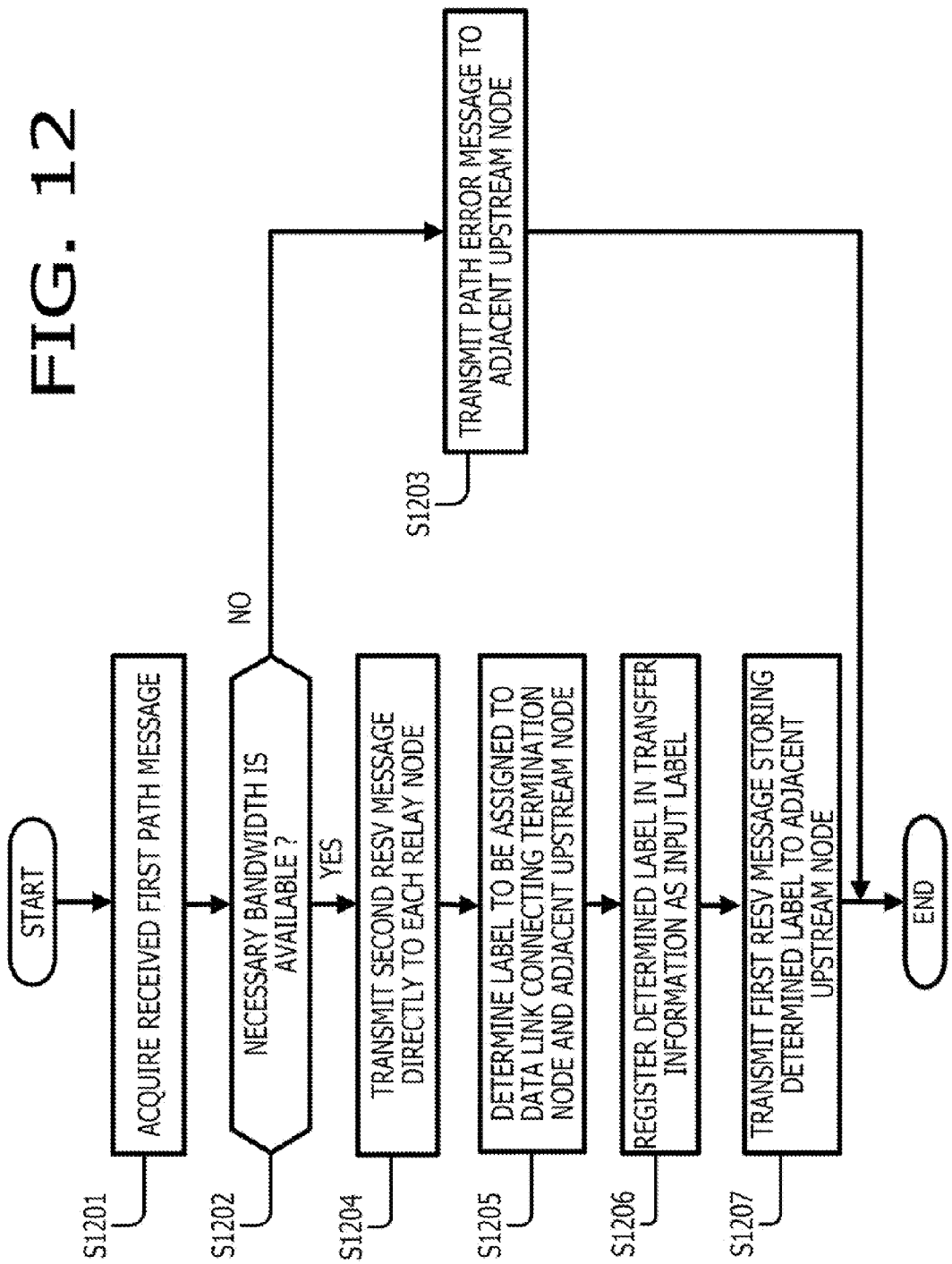
FIG. 12 is a diagram illustrating an example of a flowchart for signaling processing that is performed by a termination node, according to a first embodiment.

FIG. 12 is a diagram illustrating an example of a flowchart for signaling processing that is performed by a termination node, according to a first embodiment. Signaling processing part 413 of termination node 140 performs, for example, the following sequence of operations as signaling processing for a termination node.

In operation S1201, termination node 140 acquires the first path message that was received in operation S903 of FIG. 9.

In operation S1202, it is determined whether termination node 140 has an available bandwidth needed for data transfer requested by the first path message acquired in operation S1201. When termination node 140 does not have an available bandwidth needed for the requested data transfer (NO in operation S1102), termination node 140 transmits a PATH error message indicating that termination node 140 does not have an available bandwidth needed for the requested data transfer, to adjacent upstream node 130 (in operation S1203). Here, the PATH error message is transferred between each pair of adjacent nodes in the upstream direction until reaching origination node 110 along a communication path to be established, and error processing is performed in each of nodes that has received the PATH error message.

When it is determined that termination node 140 has an available bandwidth needed for the requested data transfer (YES in operation S1202), termination node 140 transmits a second RESV message including label assignment request information, directly to each of relay nodes along the communication path (in operation S1204). Here, signaling processing part 413 of termination node 140 identifies each of output interfaces of relay nodes 120 and 130, via which the first path message was transferred, based on destination interface information stored in the "RECORD_ROUTE" field of the first path message acquired in operation S1201. Then, signaling processing part 413 transmits the second RESV message directly to the identified output interface of the each of relay nodes, using the destination interface identifier as a destination address of the second RESV message. Then termination node 140 performs the following operations S1205 to S1207, as label assignment processing.

In operation S1205, termination node 140 determines a label to be assigned to a data link connecting termination node 140 and adjacent upstream node 130.

In operation S1206, termination node 140 registers the label determined in operation S1205 in transfer information 240 held in transfer information storing part 414, as an input label that is to be used for transferring data packets between termination node 140 and adjacent upstream node 130.

In operation S1207, termination node 140 transmits a first RESV message storing the label determined in operation S1206, to adjacent upstream node 130, and then ends the sequence of operations.

Performing the sequence of operations described above allows termination node 140 to transmit a second RESV message including label assignment request information, directly to each of relay nodes 120 and 130 so that relay nodes 120, 130 concurrently perform the label assignment processing independently each other. Further, termination node 140 may be configured to perform label assignment processing for assigning a label to a data link connecting termination node 140 and adjacent upstream node 130, after transmitting a second RESV message including label assignment request information to the adjacent upstream node, so the label assignment processing on relay nodes and the label assignment processing on a termination node are performed concurrently.

Figure 13:
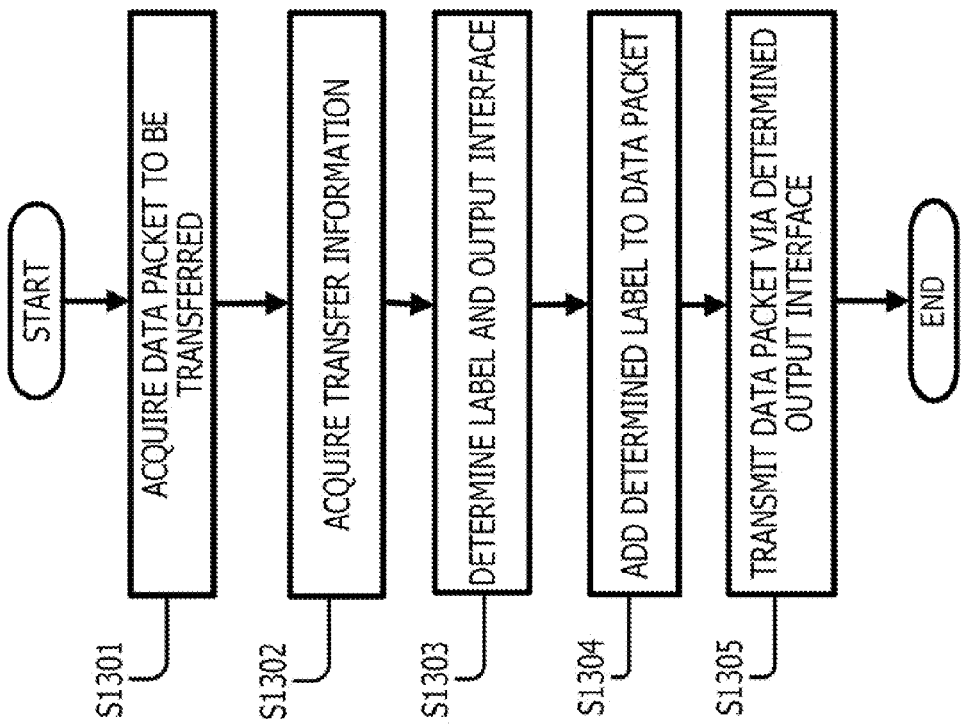
FIG. 13 is a diagram illustrating an example of data transfer processing performed by an origination node, according to a first embodiment.

FIG. 13 is a diagram illustrating an example of data transfer processing performed by an origination node, according to a first embodiment. Data transfer part 415 of origination node 110 performs, for example, the following sequence of operations as data transfer processing for an origination node.

In operation S1301, origination node 110 acquires a data packet to be transferred.

In operation S1302, origination node 110 acquires transfer information 210 from transfer information storing part 414.

In operation S1303, origination node 110 determines a label to be assigned to a data packet to be transferred, and determines an output interface via which the data packet is to be transferred, based on transfer information 210 acquired in operation S1302.

In operation S1304, origination node 110 adds the label determined in operation S1303 to the data packet acquired in operation S1301.

In operation S1305, origination node 110 transmits the data packet having the label added in operation S1304 via the output interface determined in operation S1303, and then ends the sequence of operations. Performing the above mentioned sequence of operations allows origination node 110 to transfer the data packet acquired in operation S1301 to an adjacent downstream node (in the case, node 120).

FIG. 14 is a diagram illustrating an example of data transfer processing performed by a relay node, according to a first embodiment. Data transfer part 415 of relay node 120 performs, for example, the following sequence of operations as data transfer processing for a relay node. In FIG. 14, although description will be given of data transfer processing performed by relay node 120, data transfer processing may be performed in the similar manner by relay node 130, and description for relay node 130 will be omitted here.

In operation S1401, it is determined whether relay node 120 has received a data packet from an adjacent upstream node (in the case, origination node 110) via an input interface provided for node 120, and waits for reception of a data packet (No in operation S1401). When relay node 120 has received the data packet (YES in operation S1401), relay node 120 acquires transfer information 220 from transfer information storing part 414 (in operation S1402).

In operation S1403, relay node 120 determines a label to be assigned to a data packet to be transferred, and determines an output interface via which the data packet is to be transmitted, based on transfer information 220 acquired in operation S1402.

In operation S1404, relay node 120 adds the label determined in operation S1403 to the data packet, after deleting the label included in the data packet received in operation S1401.

In operation S1405, relay node 120 transmits the data packet having the label added in operation S1404 via the output interface determined in operation S1403, and then ends the sequence of operations. Performing the above sequence of operations allows relay node 120 to transfer a data packet received from an adjacent upstream node (for example, node 110) via an interface, to an adjacent downstream node (for example, node 130) via an output interface.

FIG. 15 is a diagram illustrating an example of data transfer processing performed by a termination node, according to a first embodiment. Data transfer part 415 of termination node 140 performs, for example, the following sequence of operations as data transfer processing for a termination node.

In operation S1501, it is determined whether termination node 140 has received a data packet from an adjacent upstream node (in the case, node 130) via an interface, and waits for reception of a data packet (NO in operation S1501). Upon receiving the data packet (YES in operation S1501), termination node 140 acquires transfer information 240 from transfer information storing part 415 (in operation S1502).

In operation 1503, termination node 140 determines an output interface via which the data packet is to be transmitted, based on transfer information 240 acquired in operation S1502. At the same time, termination node 140 deletes the label included in the data received in operation S1501.

In operation S1504, termination node 140 transmits the data packet in which the label has been deleted, via the output interface determined in operation S1503, and then ends the sequence of operations. Performing the above mentioned sequence of operations allows termination node 140 to transmit a data packet received from an adjacent upstream node (for example, node 130) via an input interface, to another node outside the established communication path via an output interface.

As mentioned above, in communication system 100 according to a first embodiment, a termination node of a communication path to be established, transmits a second RESV message including label assignment request information directly to each of relay nodes without depending on label assignment processing performed on other nodes along the communication path. This allows each of relay nodes to concurrently perform label assignment processing, thereby reducing a processing time needed for establishing the communication path. In this way, according to a first embodiment, each of relay nodes may be configured to perform label assignment processing independently each other, and the communication path may be established in such a manner that each of relay nodes concurrently performs label assignment processing.

Further, a termination node may be configured to perform label assignment processing for assigning a label to a data link connecting the termination node and the adjacent upstream node, after transmitting a second RESV message including label assignment request information to one or more relay nodes. This allows a termination node and each of one or more relay nodes to concurrently perform label assignment processing, thereby further reducing a processing time needed for establishing a communication path.

Further, each of relay nodes may be configured to add destination interface information identifying an output interface via which a first path message is to be transmitted, to route information included in the first path message. This allows a termination node to transmit a second RESV message directly to each of relay nodes that is not adjacent to the termination node along the communication path, using the destination interface information as a destination address of the second RESV message.

Communication system 100 according to a second embodiment may be configured, for example, in a manner similar to communication system 100 as depicted in FIGS. 1 to 3. Communication apparatus 400 applicable to each of nodes included in communication system 100 according to the second embodiment, may be configured, for example, in a manner similar to communication apparatus 400 as depicted in FIG. 4. Therefore, description of the second embodiment will be given with reference to FIGS. 1 to 4.

Figure 16A:
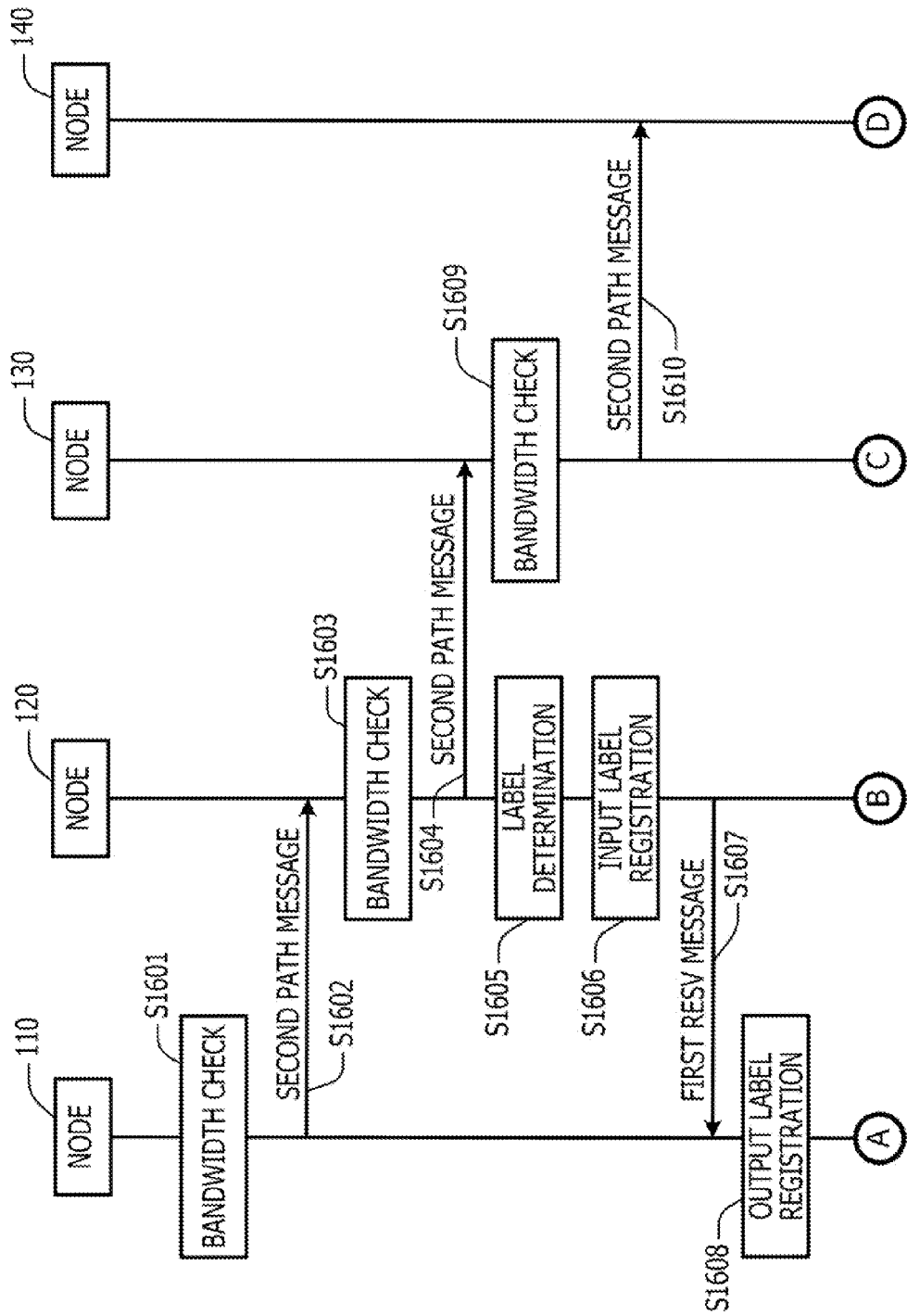
FIGS. 16A, 16B are diagrams illustrating an example of an operational sequence for establishing a communication path, according to a second embodiment.
Figure 16B:
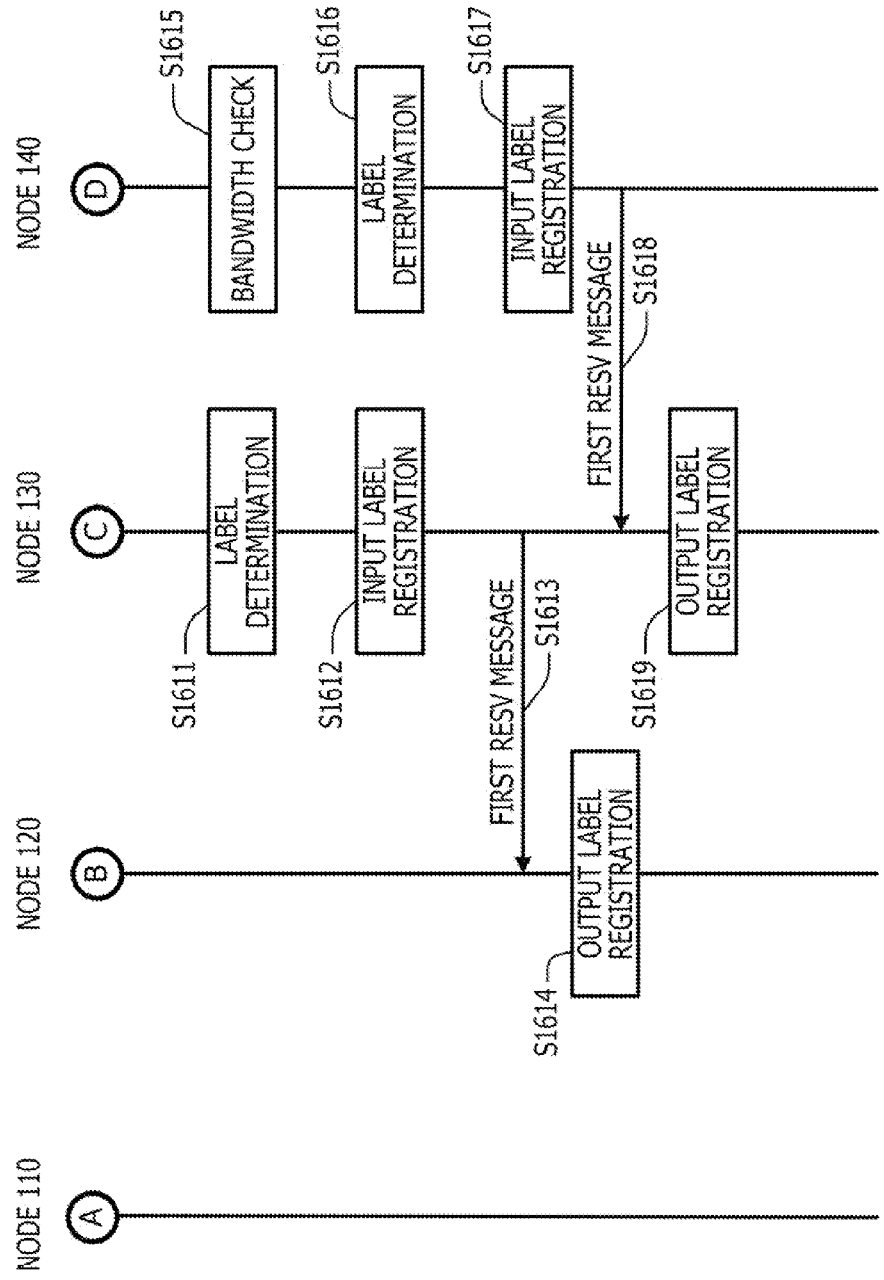

FIGS. 16A, 16B are diagrams illustrating an example of an operational sequence for establishing a communication path, according to a second embodiment. In FIGS. 16A and 16B, it is assumed that node 110 has received a data transfer command requesting that data packets should be transferred through a communication path passing through a sequence of nodes 110, 120, 130, and 140. In the case, node 110 becomes an origination node, nodes 120, 130 become relay nodes, and node 140 becomes a termination node.

In operation S1601, origination node 110 performs bandwidth check processing according to a data transfer command, for example, input by a user. In FIGS. 16A, 16B, description will be given of the case in which each of nodes along the communication path has an available bandwidth needed for data transfer requested by the data transfer command.

In operation S1602, origination node 110 creates a second path message (which will be described later with reference to FIG. 17) for requesting each node to allocate a bandwidth needed for the data transfer requested by the data transfer command, and for requesting a node to perform label assignment processing. Here, the second path message is configured to include bandwidth information, route information, and label assignment request information. The bandwidth information indicates a bandwidth needed for transferring data packets along a communication path to be established. The route information identifies a sequence of nodes and interfaces along a communication path to be established, via which data packets are to be transferred. The label assignment request information is information for requesting a node to perform label assignment processing for assigning a label to a data link connecting each pair of adjacent nodes along a communication path to be established. In the example of FIGS. 16A, 16B, the route information identifies a sequence of nodes 110, 120, 130, and 140, and interfaces via which data packets are transferred. Origination node 110 transmits the created second path message to adjacent downstream node 120 identified by the route information.

In operation S1603, node 120 recognizes that node 120 is a relay node, based on the route information included in the second path message received in operation S1602. Further, node 120 recognizes that node 110 is an adjacent upstream node and node 130 is an adjacent downstream node, based on the route information included in the second path message. Next, relay node 120 performs bandwidth check processing based on bandwidth information included in the received second path message.

In operation S1604, relay node 120 transfers the received second path message to downstream node 130. Here, since the received second path message includes label assignment request information, relay node 120 performs the following operations S1605 to S1607 as label assignment processing.

In operation S1605, relay node 120 determines a label to be assigned to a data link connecting relay node 120 and adjacent upstream node 110.

In operation S1606, relay node 120 registers the label determined in operation S1605, in transfer information 220 held in transfer information storing part 414, as an input label that is to be used for transferring data packets between relay node 120 and adjacent upstream node 110.

In operation S1607, relay node 120 transmits a first RESV message containing the label determined in operation S1605, to adjacent upstream node 110.

In operation S1608, node 110 registers the label contained in the received first RESV message that was transmitted in operation S1607, in transfer information 210 held in transfer information storing part 414, as an output label that is to be used for transferring data packets between node 110 and adjacent downstream node 120.

In operation S1609, upon receiving the second path message, node 130 recognizes that node 130 is a relay node based on the route information included in the received second path message. Further, node 130 recognizes that node 120 is an adjacent upstream node and node 140 is an adjacent downstream node, based on the route information included in the received second path message. Then, node 130 performs bandwidth check processing based on bandwidth information included in the received second path message.

In operation S1610, node 130 transfers the received second path message to adjacent downstream node 140. At the same time, since the label assignment request information is included in the received second path message, node 130 performs the following operations S1611 to S1613 as label assignment processing.

In operation S1611, node 130 determines a label to be assigned to a data link connecting node 130 and adjacent upstream node 120.

In operation S1612, node 130 registers the label determined in operation S1611, in transfer information 230 held in transfer information storing part 414, as an input label that is to be used for transferring data packets between node 130 and adjacent upstream node 120.

In operation S1613, node 130 transmits a first RESV message in which the label determined in operation S1611 is stored, to adjacent upstream node 120.

In operation S1614, upon receiving the first RESV message from node 130, node 120 registers the label stored in the received first RESV message that was transmitted in operation S1613, in transfer information 220 held in transfer information storing part 414, as an output label that is to be used for transferring data packets between node 120 and adjacent downward node 130.

In operation S1615, upon receiving the second path message that was transmitted in operation S1610, node 140 recognizes that node 140 is a termination node based on the route information included in the received second path message. Further, node 140 recognizes that node 130 is an adjacent upstream node based on the route information included in the received second path message. Then, node 140 performs bandwidth check processing based on the bandwidth information included in the received second path message. At the same time, since the label assignment request information is included in the received second path message, termination node 140 performs the following operations S1616 to S1617, as label assignment processing.

In operation S1616, termination node 140 determines a label to be assigned to a data link connecting node 140 and adjacent upstream node 130.

In operation S1617, node 140 registers the label determined in operation S1616, in transfer information 240 held in transfer information storing part 414, as an input label that is to be used for transferring data packets between node 140 and adjacent upstream node 130.

In operation S1618, node 140 transmits a first RESV message containing the label determined in operation S1616, to adjacent upstream node 130.

In operation S1619, upon receiving the first RESV message from adjacent downstream node 140, node 130 registers the label contained in the received first RESV message that was transmitted in operation S1618, in transfer information 230 held in transfer information storing part 414, as an output label that is to be used for transferring data packets between node 130 and adjacent downstream node 140.

By performing the sequence of operations described above, a label is assigned to a data link connecting each pair of adjacent nodes along a communication path to be established, and the communication path for transferring data packets via a sequence of nodes 110, 120, 130, and 140, may be established. Here, upon receiving a second path message, nodes 130 and 140 perform label assignment processing independently each other so that label assignment processing by node 130 and label assignment processing by node 140 are concurrently executed. For example, label assignment processing in operations S1605 to S1607 and label assignment processing in operations S1611 to S1613 are executed concurrently, thereby reducing a processing time needed for establishing a communication path.

Further, because termination node 140 also performs label assignment processing at the time of receiving a second path message, label assignment processing by each of relay nodes and label assignment processing by a termination node may be performed concurrently. For example, label assignment processing in operations S1605 to S1607, label assignment processing in operations S1611 to S1613, and label assignment processing in operations S1616 to S1617, are performed concurrently, thereby further reducing a processing time needed for establishing a communication path.

Figure 17:
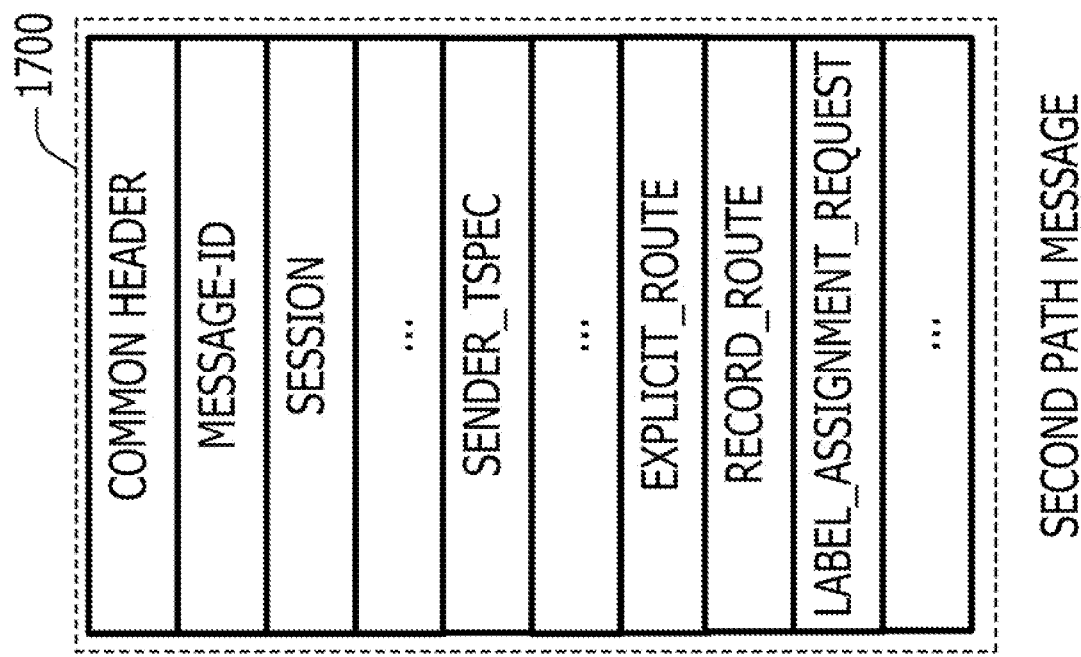
FIG. 17 is a diagram illustrating an example of a second path message, according to a second embodiment.

FIG. 17 is a diagram illustrating an example of a second path message, according to a second embodiment. Control message 1700 depicted in FIG. 17 indicates a second path message that is transferred in the downstream direction from an origination node to a termination node via each of one or more relay nodes along a communication path, as depicted in FIGS. 16A, 16B. Second path message 1700 may be configured to include, for example, a "LABEL_ASSIGNMEN-T_REQUEST" field, in addition to a "COMMON HEADER" field, a "MESSAGE-ID" field, a "SESSION" field, a "SENDER_TSPEC" field, an "EXPLICIT_ROUTE" field, and a "RECORD_ROUTE" field, which are also included in a first path message. The second path message is different from a first path message in that the second path message includes the "LABEL_ASSIGNMENT_REQUEST" field which is not included in the first path message.

The "COMMON HEADER" field, the "MESSAGE-ID" field, the "SESSION" field, the "SENDER_TSPEC" field, the "EXPLICIT_ROUTE" field, and the "RECORD_ROUTE" field have the same meanings as those of first path message 600 depicted in FIG. 6, except that destination information identifying an output interface of a node via which second path message 1700 is transmitted is not stored in the "RECORD_ROUTE" field of second path message 1700.

The "LABEL_ASSIGNMENT_REQUEST" field stores information for requesting a node to perform label assignment processing for assigning a label to a data link connecting the node and an adjacent upstream node. Upon receiving second path message 1700, each of nodes 120, 130, and 140 performs label assignment processing without waiting for reception of a first RESV message from adjacent downstream node.

A first RESV message depicted in FIGS. 16A, 16B, which is transferred from each node to an adjacent upstream node in response to reception of the second path message, may be configured to be the same as that of depicted in FIG. 7.

Figure 18:
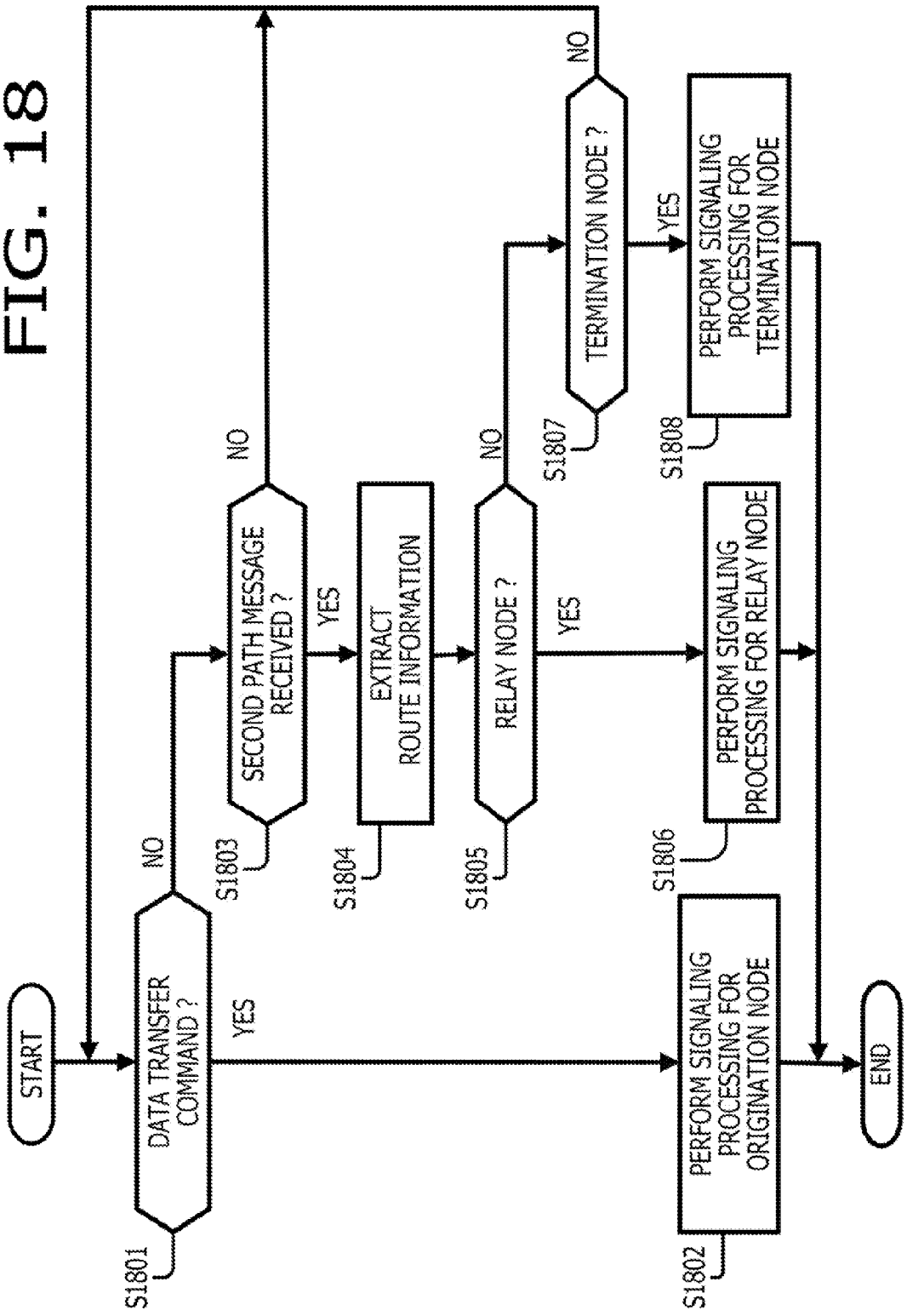
FIG. 18 is a diagram illustrating an example of a flowchart that is performed by each of nodes along a communication path to be established, according to a second embodiment.

FIG. 18 is a diagram illustrating an example of a flowchart that is performed by each of nodes along a communication path to be established, according to a second embodiment. Hereinafter, each of nodes 110, 120, 130, and 140 depicted in FIG. 1 will be also simply referred to as a node, for convenience of explanation. Operations depicted in FIG. 18 are performed in a manner similar to those of FIG. 9 except for operations S1803 and S1804. In operation S1803, it is determined whether signaling processing part 413 has received a second path message (not a first path message) from an adjacent upstream node, and the node extracts route information from the received second path message (in operation S1804).

For example, in the example depicted in FIGS. 16A, 16B, node 110 recognizes that node 110 is an origination node in the similar manner as FIG. 9, and performs signaling processing for an origination node which will be described later with reference to FIG. 19. Nodes 120 and 130 recognize that nodes 120 and 130 are relay nodes, respectively, in the similar manner as FIG. 9, and perform signaling processing for a relay node which will be described later with reference to FIG. 20. Further, node 140 recognizes that node 140 is a termination node in the similar manner as FIG. 9, and performs signaling processing for a termination node which will be described later with reference to FIG. 21. The detailed description about the flowchart depicted FIG. 18 will be omitted here.

Figure 19:
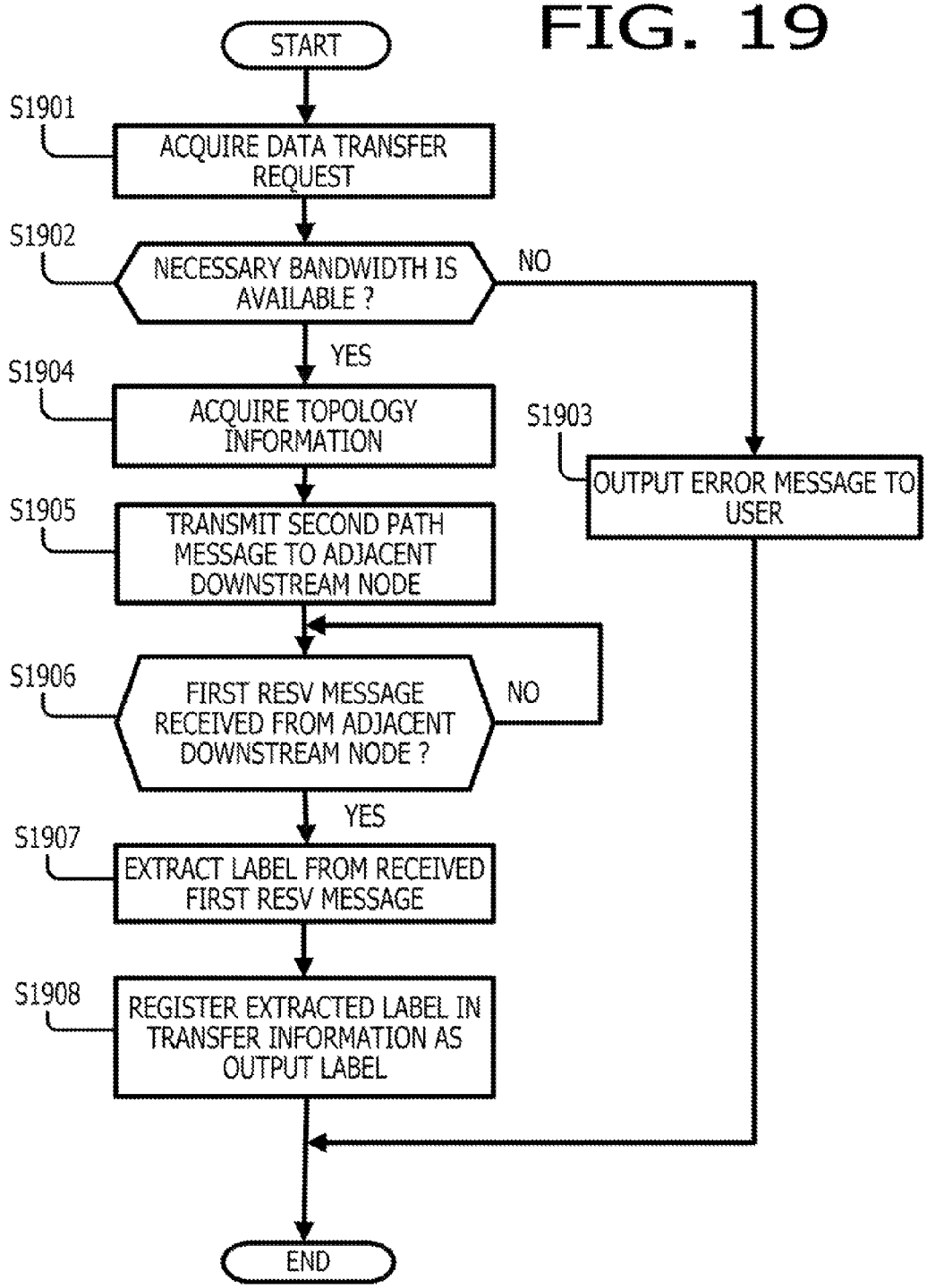
FIG. 19 is a diagram illustrating an example of a flowchart that is performed by an origination node, according to a second embodiment.

FIG. 19 is a diagram illustrating an example of a flowchart that is performed by an origination node, according to a second embodiment. Signaling processing part 413 of origination node 110 performs, for example, a sequence of operations as depicted in FIG. 19 as signaling processing for an origination node. Operations depicted in FIG. 19 are performed in a manner similar to those of FIG. 10 except for operation S1905. In operation S1905, signaling processing part 413 creates a second path message as depicted in FIG. 17 (not a first path message) based on the data transfer command acquired in operation S1901, and transmits the created second path message (not the created first path message) to adjacent downstream node 120. The detailed description of the flowchart depicted FIG. 19 will be omitted here.

Performing the sequence of operations depicted in FIG. 19 allows origination node 110 to transfer a second path message complying with the requested data transfer command, to adjacent downstream node 120, and, at the same time, to register the label determined by node 120 in transfer information 210 held in transfer information storing part 414, as an out put label to be used for transferring data packets between node 110 and adjacent downstream node 120.

Figure 20:
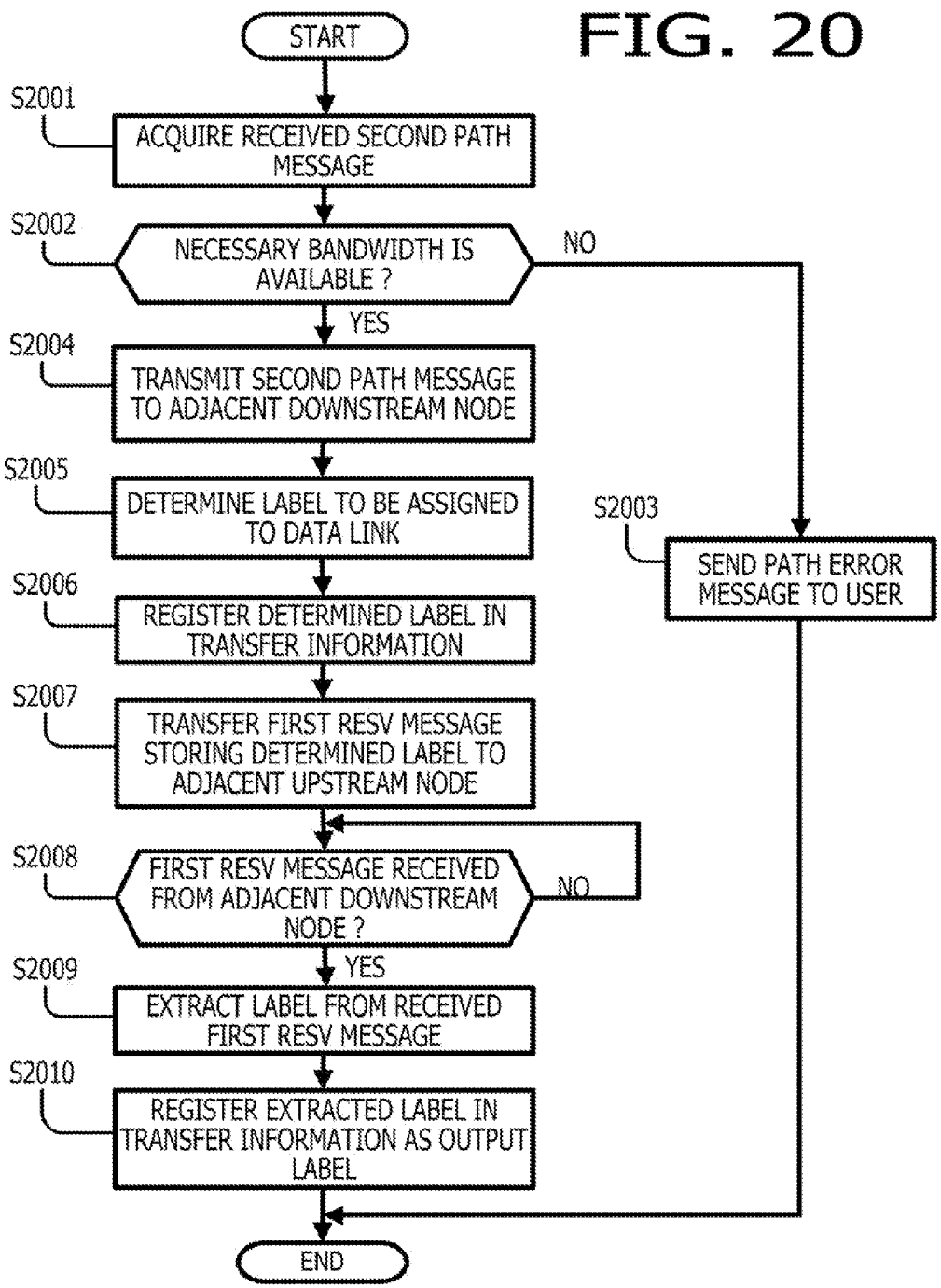
FIG. 20 is a diagram illustrating an example of a flowchart for signaling processing that is performed by a relay node, according to a second embodiment.

FIG. 20 is a diagram illustrating an example of a flowchart for signaling processing that is performed by a relay node, according to a second embodiment. Signaling processing part 413 of relay node 120 performs, for example, the following sequence of operations as signaling processing for a relay node. In FIG. 20, although description will be given of signaling processing performed by node 120, signaling processing performed by node 130 may be the same as that of node 120, and description thereof will be omitted here.

In operation S2001, relay node 120 acquires a second path message that was received in operation S1803 of FIG. 18.

In operation S2002, it is determined whether relay node 120 has an available bandwidth needed for data transfer requested by the second path message acquired in operation S2001. When relay node 120 does not have an available bandwidth needed for the requested data transfer (NO in operation S2002), relay node 120 transmits a PATH error message indicating that node 120 does not have an available bandwidth needed for the requested data transfer, to an adjacent upstream node (in operation S2003). In the case, the PATH error message is transferred between each pair of adjacent nodes along a communication path in the upstream direction from node 120 to origination node 110, and each of nodes performs error processing upon receiving the PATH error message.

Meanwhile, when relay node 120 has an available bandwidth needed for the requested data transfer (YES in operation S2002), relay node 120 transfers the second path message to an adjacent downstream node (in operation S2004).

Operations S2005 to S2010 depicted in FIG. 20 may be performed in a manner similar to operations S1106 to S1111 depicted in FIG. 11, and the description of operations S2005 to S2010 will be omitted here.

Performing the sequence of operations described above allows relay node 120 to transfer the second path message received from adjacent upstream node 110 to adjacent downstream node 130. At the same time, relay node 120 performs label assignment processing for assigning a label to a data link connecting node 120 and adjacent upstream node 110 upon receiving the second path message since the received second path message includes label assignment request information. This allows relay node 120 to perform the label assignment processing, without waiting for completion of the label assignment processing performed by downstream nodes 130 or 140.

In the similar manner, relay node 130 is able to transfer the second path message received from adjacent upstream node 120 to termination node 140. At the same time, relay node 130 performs label assignment processing for assigning a label to a data link connecting node 130 and adjacent upstream node 120 upon receiving the second path message. This allows relay node 130 to perform the label assignment processing without waiting for completion of label assignment processing performed by termination node 140.

FIG. 21 is a diagram illustrating an example of a flowchart for signaling processing that is performed by a termination node, according to a second embodiment. Signaling processing part 413 of termination node 140 performs, for example, the following sequence of operations as signaling processing for a termination node.

In operation S2101, signaling processing part 413 of termination node 140 acquires the second path message that was received in operation S1803 of FIG. 18.

In operation S2102, signaling processing part 413 of termination node 140 determines whether termination node 140 has an available bandwidth needed for data transfer requested by the second path message acquired in operation S2101.

When termination node 140 does not have an available bandwidth needed for the requested data transfer (NO in operation S2102), node 140 transmits a PATH error message indicating that node 140 does not have available bandwidth needed for the requested data transfer, to an adjacent upstream node (in operation S2103). In the case, the PATH error message may be transferred between each pair of adjacent nodes along a communication path in the upstream direction from a termination node to origination 110, and each of nodes performs error processing upon receiving the PATH error message.

Operations S2104 to S2106 depicted in FIG. 21 may be performed in a manner similar to operations S1205 to S1207 depicted in FIG. 12, and the description of operations S2104 to S2106 will be omitted here.

In the second embodiment, each of nodes may be configured to perform data transfer processing in a manner similar to data transfer processing depicted in FIGS. 13 to 15.

As described above, in communication system 100 according to a second embodiment, each of relay nodes performs label assignment processing upon receiving a second path message transferred along a communication path to be established. This allows each of relay nodes to concurrently perform label assignment processing, thereby reducing a processing time needed for establishing a communication path. In this way, label assignment processing is performed independently in each of nodes along a communication path to be established, and the communication path may be established by performing label assignment processing concurrently on each of nodes positioned along the communication path.

Hereinafter, description will be given of a third embodiment.

A communication system according to a third embodiment may be configured in a manner similar to communication system 100 that was depicted in FIGS. 1 and 3. Further, a communication apparatus applied to each of nodes included the communication system according to the third embodiment may be configured in a manner similar to communication apparatus 400 depicted in FIG. 4.

Figure 22A:
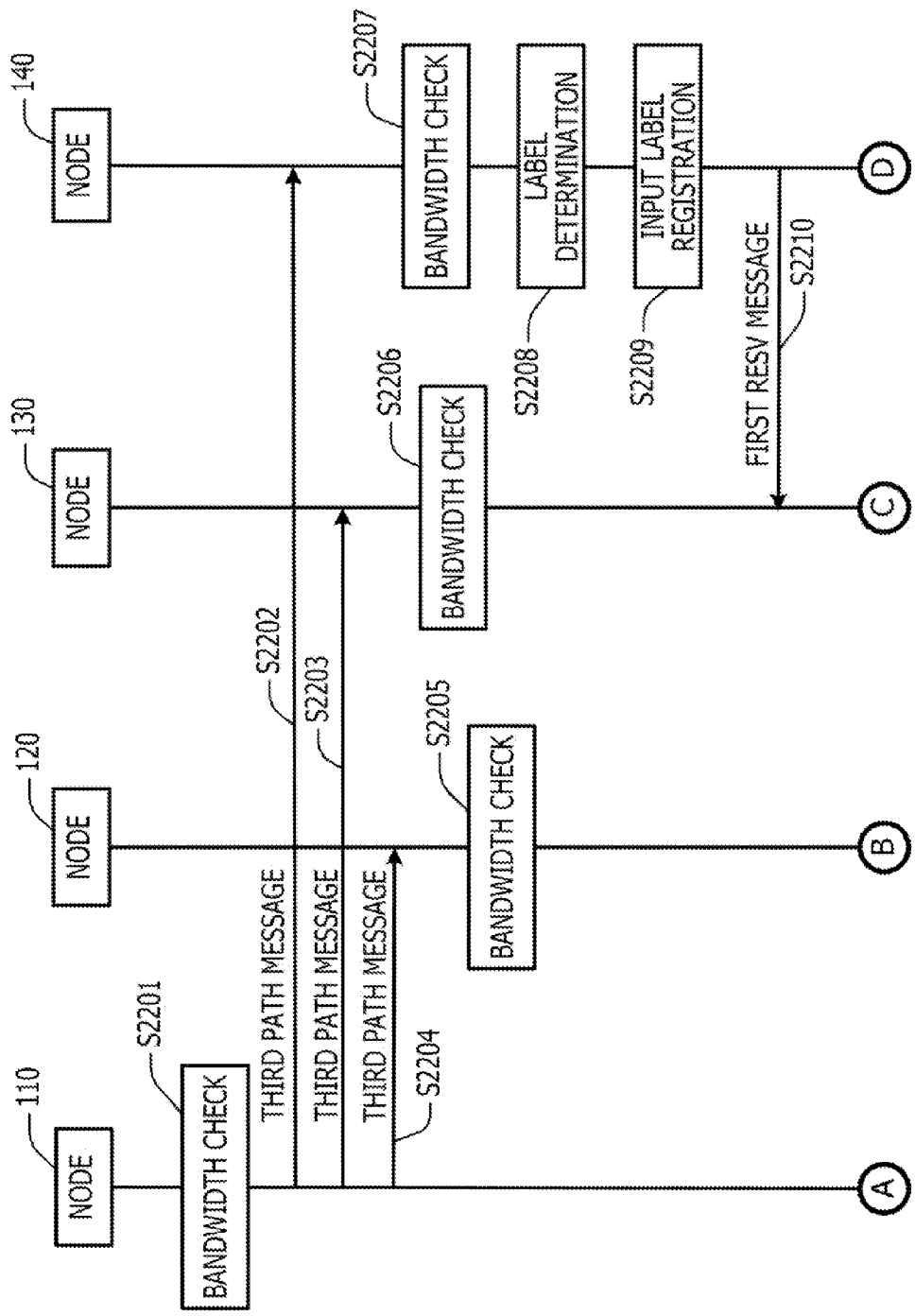

FIGS. 22A, 22B are diagrams illustrating an example of an operational sequence for establishing a communication path, according to a third embodiment. In FIGS. 22A and 22B, it is assumed that a data transfer command is input to node 110. In the case, the data transfer command requests data packets to be transferred along a communication path passing through a sequence of nodes 110, 120, 130, and 140. Node 110 becomes an origination node of the communication path, nodes 120, 130 become relay nodes of the communication path, and node 140 becomes a termination node of the communication path.

In operation S2201, origination node 110 performs bandwidth check processing based on the data transfer command. In FIGS. 22A, 22B, description will be given of the case where each node is able to acquire a bandwidth needed for data transfer requested by the data transfer command.

In operation S2202, origination node 110 creates a third path message including route information and bandwidth information, which will be described later with reference to FIG. 23. In the example depicted in FIGS. 22A, 22B, the route information includes information identifying a sequence of nodes 110, 120, 130, and 140 that pass through a communication path to be established. Further, node 110 adds, to the route information, destination interface information identifying an output interface of each node along the communication path.

In operations S2202 to S2204, origination node 110 transmits the created third path message concurrently and directly to each of downstream nodes. For example, node 110 transmits the created third path message concurrently and directly to nodes 140, 130, 120, respectively.

In operation S2205, node 120 recognizes that node 120 is a relay node, based on the route information included in the third path message received in operation S2204. Further, node 120 recognizes that node 110 is an adjacent upstream node and node 140 is an adjacent downstream node, based on the route information included in the received third path message. Then, relay node 120 performs bandwidth check processing based on the bandwidth information included in the received third path message.

In operation S2206, node 130 recognizes that node 130 is a relay node, based on the route information included in the third path message received in operation S2203. Further, node 130 recognizes that node 120 is an adjacent upstream node and node 140 is an adjacent downstream node, based on the route information included in the received third path message. Then, node 130 performs bandwidth check processing based on the bandwidth information included in the received third path message.

In operation S2207, node 140 recognizes that node 140 is a termination node based on the route information included in the third path message received in operation S2202. Further, node 140 recognizes that node 130 is an adjacent upstream node, based on the route information included in the received third message. Then, termination node 140 performs bandwidth check processing based on bandwidth information included in the received third path message. Then, termination node 140 performs the following operations S2208 to S2210 as label assignment processing.

In operation S2208, termination node 140 determines a label to be assigned to a data link connecting node 140 and adjacent upstream node 130.

In operation S2209, termination node 140 registers the label determined in operation S2208 in transfer information 240 held in transfer information storing part 414, as an input label that is to be used for transferring data packets between node 140 and adjacent upstream node 130.

In operation S2210, termination node 140 transmits a first RESV message as depicted in FIG. 7 that stores the label determined in operation S2208, to adjacent upstream node 130. Here, node 140 acquires destination interface information from the received third path message, and transmits the first RESV message to adjacent upstream node 130 using the acquired destination interface information as a destination address of the first RESV message.

In operation S2211, upon receiving the first RESV message from node 140, node 130 registers the label contained in the received first RESV message that was transmitted in operation S2210, in transfer information 230 held in transfer information storing part 414, as an output label that is to be used for transferring data packets between node 130 and adjacent downstream node 140. Then, node 130 performs the following operations S2212 to S2214 as label assignment processing.

In operation S2212, node 130 determines a label to be assigned to a data link connecting node 130 and adjacent upstream node 120.

In operation S2213, node 130 registers the label determined in operation S2212, in transfer information 230 held in transfer information storing part 414, as an input label to be used for transferring data packets between node 130 and adjacent upstream node 120.

In operation S2214, node 130 transmits a first RESV message in which the label determined in operation S2212 is stored, to adjacent upstream node 120. Here, node 130 acquires destination interface information from the received third path message, and transmits the first RESV message to adjacent upstream node 120 using the acquired destination interface information as a destination address of the first RESV message.

In operation S2215, upon receiving the first RESV message from node 130, node 120 registers the label contained in the received first RESV message that was transmitted in operation S2214, in transfer information 220 held in transfer information storing part 414, as an output label to be used for transferring data packets between node 120 and adjacent downstream node 130. Then, node 130 performs the following operations S2216 to S2218 as label assignment processing.

In operation S2216, node 120 determines a label to be assigned to a data link connecting node 120 and adjacent upstream node 110.

In operation S2217, node 120 registers the label determined in operation S2216, in transfer information 220 stored in transfer information storing part 414, as an input label to be used for transferring data packets between node 120 and adjacent upstream node 120.

In operation S2218, node 120 transmits a first RESV message storing the label determined in operation S2216 to adjacent upstream node 110. Here, node 120 acquires destination interface information from the received third path message, and transmits the first RESV message to adjacent upstream node 110 using the acquired destination interface information as a destination address of the first RESV message.

In operation S2219, upon receiving the first RESV message from node 120, node 110 registers the label contained in the received first RESV message that was transmitted in operation S2218, in transfer information 210 held in transfer information storing part 414, as an output label to be used for transferring data packets between node 110 and adjacent downstream node 120, and then ends the sequence of operations.

By performing the sequence of operations described above, a label is assigned to each data link connecting a pair of adjacent nodes along a communication path to be established, and the communication path passing through a sequence of nodes 110, 120, 130, and 140 may be established. Further, origination node 110 transmits a third path message concurrently and directly to each of relay nodes 120 and 130, thereby allowing nodes 120 and 130 to perform bandwidth check processing concurrently. For example, bandwidth check processing in operation S2205 and bandwidth check processing in operation S2206 are performed concurrently. This reduces a processing time needed for establishing a communication path.

Further, origination node 110 transmits a third path message concurrently and directly to each of relay nodes 120, 130, and terminal node 140, thereby allowing each of relay nodes 120, 130, and terminal node 140 to concurrently perform bandwidth check processing. For example, bandwidth check processing is performed concurrently in each of operations S2205, S2206, and S2207. This allows further reducing the processing time needed for establishing a communication path.

Figure 23:
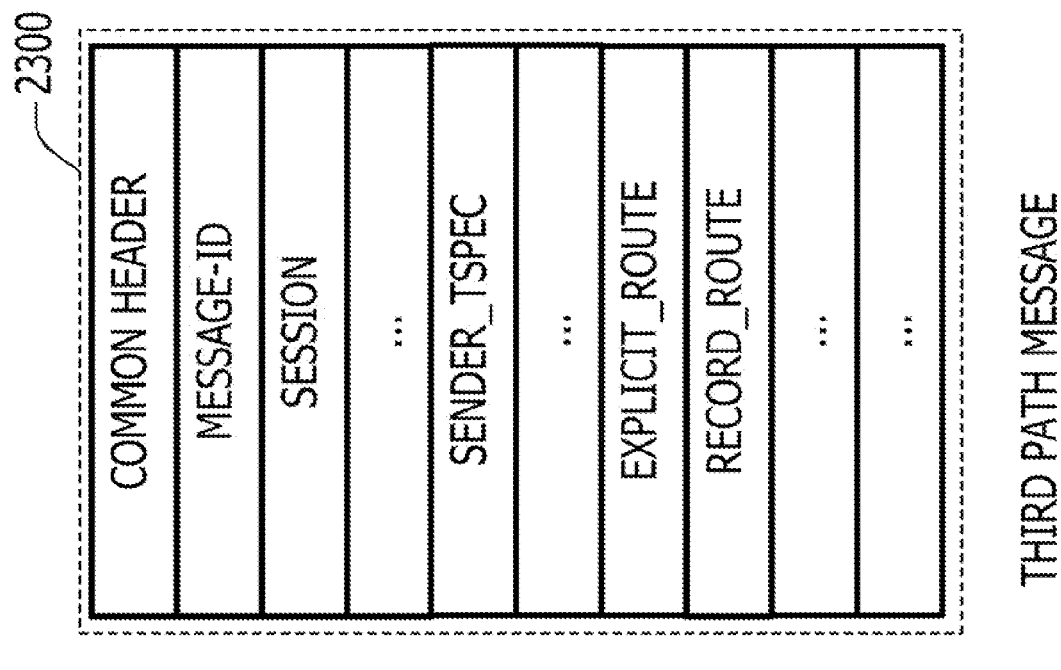
FIG. 23 is a diagram illustrating an example of a third path message, according to a third embodiment.

FIG. 23 is a diagram illustrating an example of a third path message, according to a third embodiment. In FIG. 23, control message 2300 indicates a third path message that is transmitted from an origination node, concurrently and directly to each of downstream nodes along a communication path to be established. Third path message 2300 may be configured to include, for example, a "COMMON HEADER" field, a "MESSAGE-ID" field, a "SESSION" field, a "SENDER_TSPEC" field, an "EXPLICIT_ROUTE" field, and a "RECORD_ROUTE" field.

The "COMMON HEADER" field, the "MESSAGE-ID" field, the "SESSION" field, the "SENDER_TSPEC" field, the "EXPLICIT_ROUTE" field, and the "RECORD_ROUTE" field have the same meanings as those of first path message 600 depicted in FIG. 6, respectively, except that the "RECORD_ROUTE" field of third path message 2300 does not store destination interface information identifying an output interface of each node along a communication path to be established.

In the third path message 2300, the "EXPLICIT_ROUTE" field stores, in addition to information identifying an input interface of each of nodes along the communication path, destination interface information identifying an output interface of each of nodes along the communication path. This allows each of downstream nodes (for example, nodes 120, 130, 140) to acquire, upon receiving a third path message directly from origination node 110, the destination interface information from the received third path message, and to transmit a first RESV message to adjacent upstream node using the acquired destination interface information as a destination address of the first RESV message. Here, it is unnecessary to store information identifying an output interface of termination node 140 in the "EXPLICIT_ROUTE" field of third path message.

Each of downstream nodes, for example, nodes 120, 130, and 140, upon receiving third path message 2300 directly from origination node 110, performs bandwidth check processing independently of each other, and performs label assignment processing upon receiving a first RESV message from an adjacent downstream node.

In the third embodiment, first RESV message 700 of FIG. 7 according to the first embodiment may be used as a first RESV message according to the third embodiment, and the first RESV message according to the third embodiment is also transferred between each pair of adjacent nodes in the upstream direction along a communication path to be established.

Figure 24:
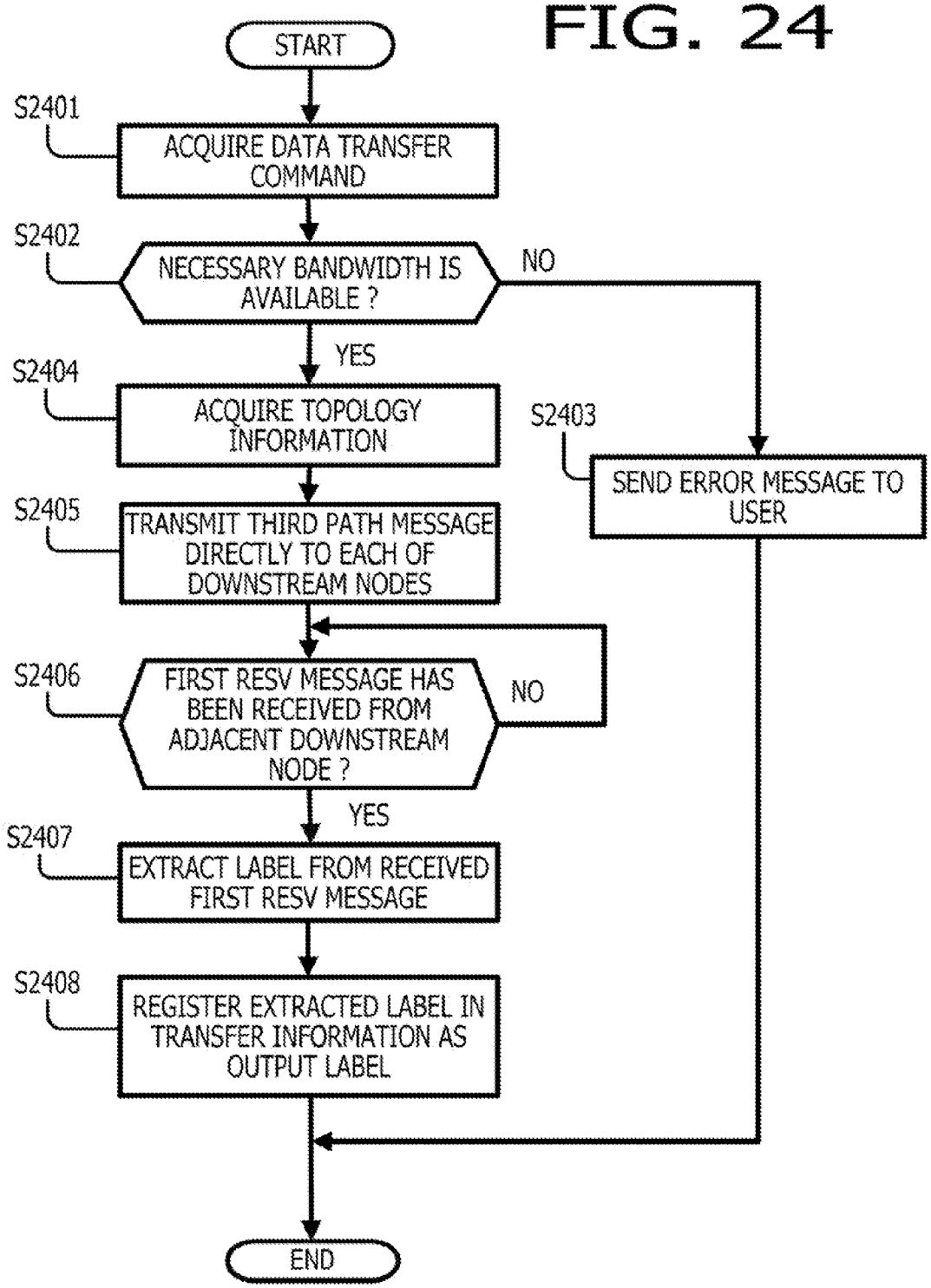
FIG. 24 is a diagram illustrating an example of a flowchart for signaling processing that is performed by an origination node, according to a third embodiment.
Figure 25:
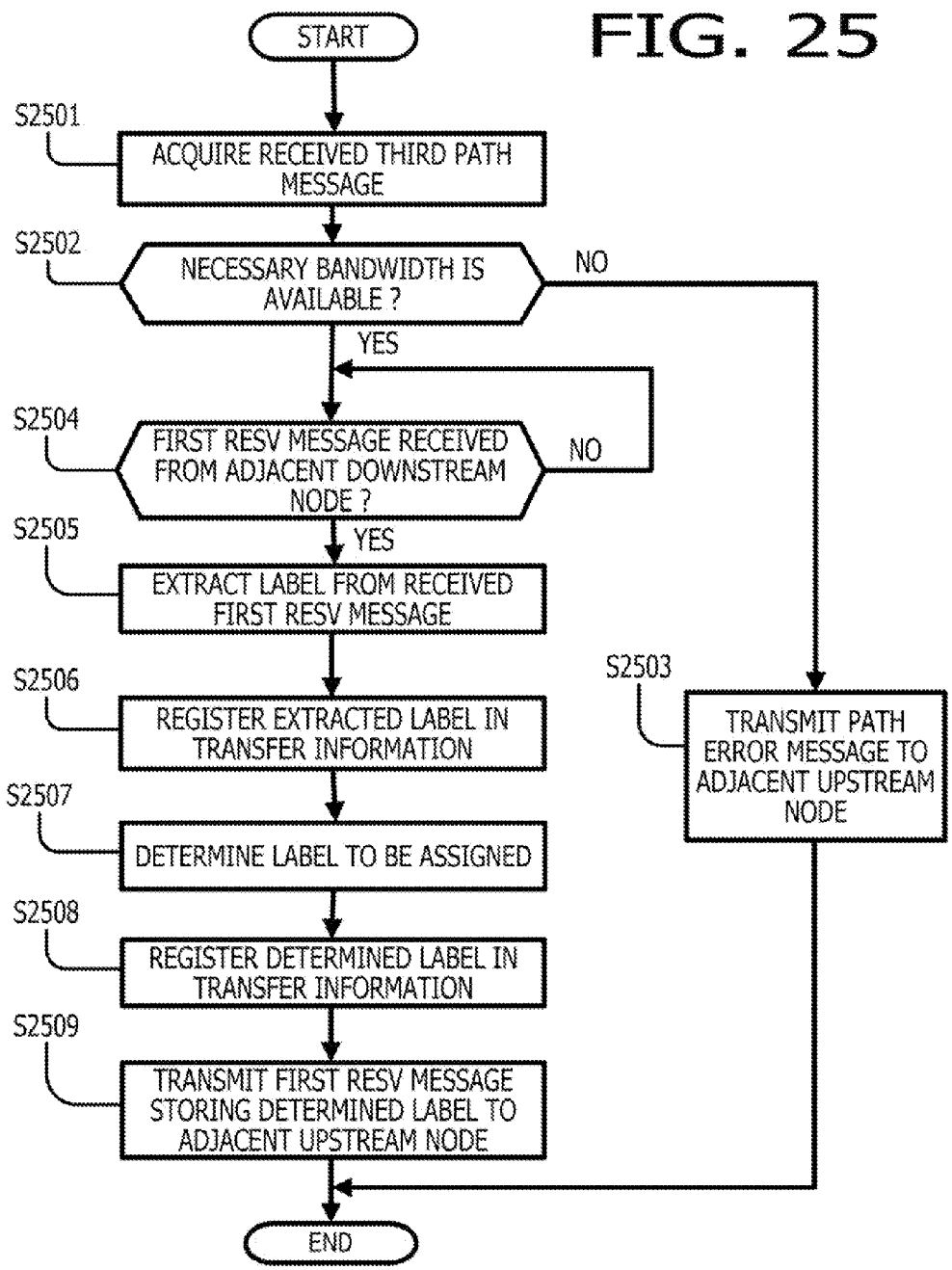
FIG. 25 is a diagram illustrating an example of a flowchart for signaling processing that is performed by a relay node, according to a third embodiment.

In the third embodiment, each of nodes along a communication path to be established in communication system 100, may be configured to perform path establishment processing in the same manner as that depicted in FIG. 18. For example, in the case of the example depicted in FIGS. 22A, 22B, node 110 recognizes that node 110 is an origination node, and performs signaling processing for an origination node (for example, as depicted in FIG. 24). Nodes 120, 130 recognize that nodes 120 and 130 are relay nodes, and perform signaling processing for a relay node (for example, as depicted in FIG. 25). Node 140 recognizes that node 140 is a termination node, and performs signaling processing for a terminal node (for example, as depicted in FIG. 21).

FIG. 24 is a diagram illustrating an example of a flowchart for signaling processing that is performed by an origination node, according to a third embodiment. Signaling processing part 413 of origination node 110 performs a sequence of operations, for example, as depicted in FIG. 24, as signaling processing for an origination node. The sequence of operations depicted in FIG. 24 is the same as those of FIG. 10 except for operation S2405. In operation S2405, signaling processing part 413 of origination node 110 creates a third path message as depicted in FIG. 23 (not a first path message), and transmits the created third path message concurrently and directly to each of downstream nodes along a communication path to be established (for example, nodes 120, 130 and 140).

By performing the sequence of operations depicted in FIG. 24, origination node 110 is able to transmit a third path message complying with the requested data transfer command, concurrently and directly to each of downstream nodes 120, 130, and 140 along a communication path to be established. This allows node 130 to perform bandwidth check processing without waiting for reception of a path message from adjacent upstream node 120. In the similar manner, node 140 is able to perform bandwidth check processing without waiting for reception of a path message from adjacent upstream node 130

FIG. 25 is a diagram illustrating an example of a flowchart of signaling processing that is performed by a relay node, according to a third embodiment. Signaling processing part 413 of relay node 120 performs, for example, the following sequence of operations as signaling processing for a relay node. In FIG. 25, although description will be given of signaling processing performed by node 120, signaling processing of relay node 130 may be performed in a manner similar to that of relay node 120, and description thereof will be omitted here.

In operation S2501, signaling processing part 413 of relay node 120 acquires the third path message received in operation S1803 of FIG. 18.

In operation S2502, it is determined whether relay node 120 has an available bandwidth needed for data transfer requested by the third path message acquired in operation S2501. When it is determined that relay node 120 does not have an available bandwidth needed for the data transfer (NO in operation S2502), relay node 120 transmits a PATH error message indicating that relay node 120 does not have an available bandwidth needed for the data transfer, to an adjacent upstream node (in operation S2503).

Meanwhile, when it is determined that relay node 120 has an available bandwidth needed for the data transfer (YES in operation S2502), relay node 120 determines whether relay node 120 has received a first RESV message from an adjacent downstream node, and waits for reception of the first RESV message (in operation S2504). Upon receiving the first RESV message (YES in operation S2504), relay node 120 extracts a label contained in the received first RESV message (in operation S2505).

In operation S2506, relay node 120 registers the label extracted in operation S2505, in transfer information 220 held in transfer information storing part 414, as an output label that is to be used for transferring data packets between node 120 and adjacent downstream node 130.

In operation S2507, relay node 120 determines a label to be assigned to a data link connecting node 120 and an adjacent upstream node 110.

In operation S2508, node 120 registers the label determined in operation S2507, in transfer information 220 held in transfer information storing part 414, as an input label to be used for transferring data packets between node 120 and adjacent upstream node 110.

In operation S2509, relay node 120 transfers a first RESV message containing the label determined in operation S2507, to adjacent upstream node 110, and then ends the sequence of operations.

Performing the above sequence of operations allows relay nodes 120 and 130 to concurrently perform bandwidth check processing upon receiving a third path message directly from origination node 110. This allows relay node 130 to perform bandwidth check processing without waiting for reception of a path message from adjacent upstream node 120.

Signaling processing for a termination node that is operated in communication system 100 according to a third embodiment, may be performed in a manner similar to that of a termination node depicted in FIG. 21.

Further, data transfer processing for each node according to the third embodiment, may be performed in a manner similar to the data transfer processing depicted in FIGS. 13 to 15.

As mentioned above, in communication system according to the third embodiment, each of relay nodes along a communication path to be established may be configured to perform bandwidth check processing upon receiving a third path message directly from an origination node. This allows each of relay nodes to concurrently perform bandwidth check processing, thereby reducing a processing time needed for establishing the communication path. In this way, because each of relay nodes is able to perform bandwidth check processing independently each other, a communication path may be rapidly established by concurrently performing bandwidth check processing for each of relay nodes.

Further, an origination node transmits a third path message in which destination interface information identifying an output interface of each of nodes along the communication path is stored. This allows each of downstream nodes (relay nodes and a termination node), which has received the third path message directly from origination node 110, to transmit a first RESV message to adjacent upstream node using the destination interface information included in the received third path message as a destination address of the first RESV message.

Here, it is also possible to configure a communication system that has both the features of the second and third embodiments. In the case, a third path message may be configured to further including label assignment request information, and an origination node transmits the third path message including the label assignment request information concurrently and directly to each of downstream nodes (one or more relay nodes and a termination node). This allows the one or more relay nodes to concurrently perform both the bandwidth check processing and the label assignment processing without depending on the bandwidth check processing and the label assignment processing that are performed on other nodes along the communication path, thereby further reducing a processing time needed for establishing a communication path.

Figure 26:
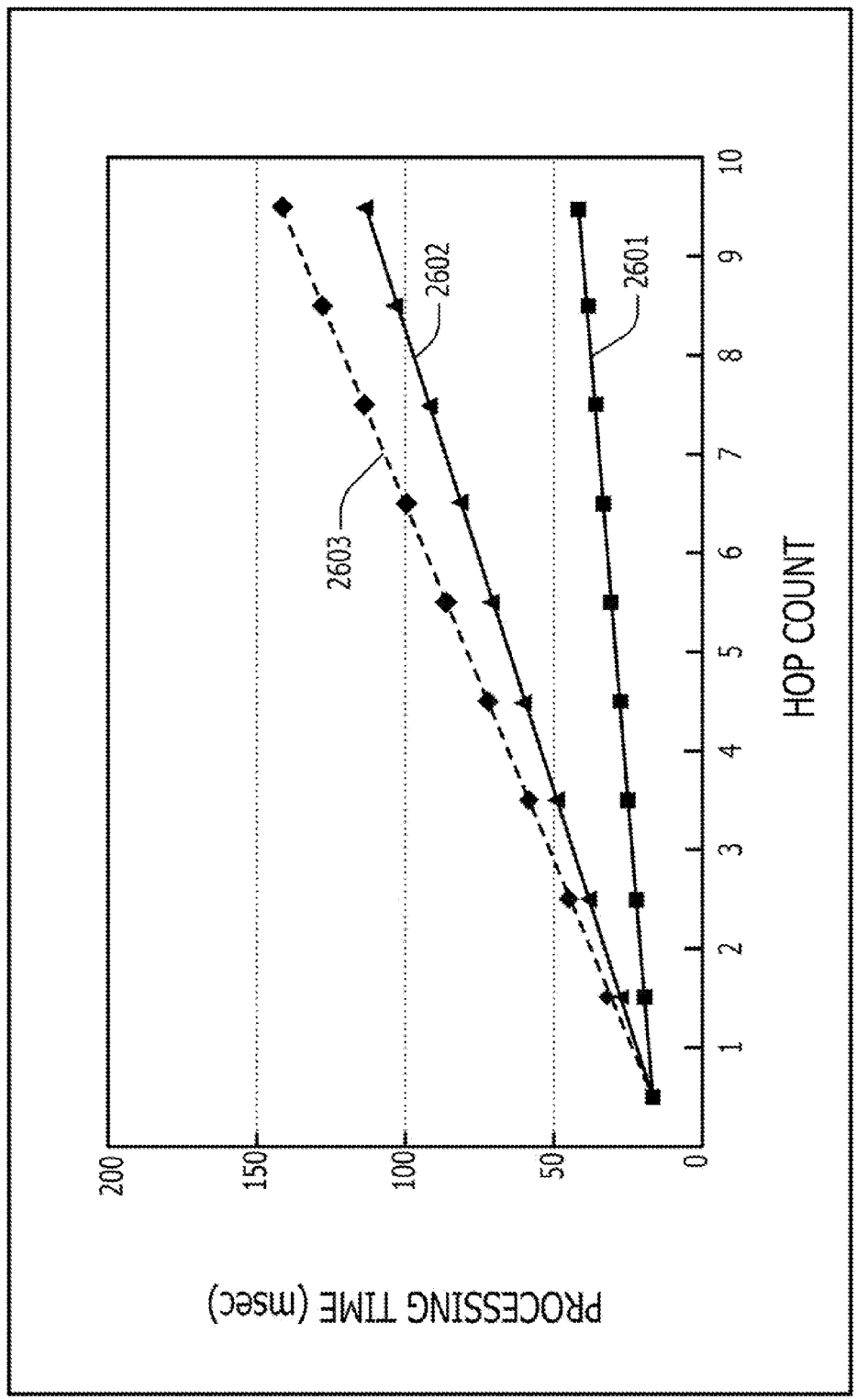
FIG. 26 is a diagram illustrating an example of a graph representing a relationship between the number of hops and a processing time for establishing a communication path, according to an embodiment.

FIG. 26 is a diagram illustrating an example of a graph representing a relationship between the number of hops and a processing time needed for establishing a communication path, according to an embodiment. In FIG. 26, a horizontal axis indicates the number of hops along a communication path to be established (the number of nodes constituting the communication path) in communication system 100. A vertical axis indicates a processing time needed for establishing the communication path in communication system 100.

Line graph 2601 indicates a relation between the number of hops and a processing time needed for establishing a communication path in communication system 100 according to first or second embodiment. Line graph 2602 indicates a relation between the number of hops and a processing time needed for establishing a communication path in communication system 100 according to a third embodiment. Line graph 2603 indicates a relation between the number of hops and a processing time needed for establishing a communication path in the case of using an RSVP.

Here, let "A" be a processing time needed for performing bandwidth check processing required from an upstream node. Let "B" be a processing time needed for performing label assignment processing. Let "C" be a processing time that is needed for transferring a message between adjacent nodes and includes a transmission delay. Further, let "X" be the number of hops from an origination node to a termination node along a communication path to be established. Line graphs 2601, 2602, 2603 indicate relations in the case of "A=2[ms]", "B=10[ms]", and "C=1[ms]", respectively.

In the case of using an existing RSVP, approximate processing time "Y" needed for distributing the whole labels may be represented as Y=(A+B+(2*C))*X. This means that all the processing times "A", "B", and "C" linearly affect "Y", and processing time "Y" increases with increase in hop count "X". Accordingly, when using an existing RSVP, processing time "Y" for establishing a communication path may drastically increase with increasing hop count "X".

In contrast, in communication system 100 according to first or second embodiment, approximate processing time "Y" needed for distributing the whole labels may be represented as Y=(A+C)*X+B+C. This is because that multiple pieces of label assignment processing on different pair of adjacent nodes along the communication path (relating to "B+C") are performed concurrently, and it is unnecessary to multiply "B+C" by the number of hops "X". Accordingly, in the case of communication system 100 according to the first or second embodiment, increase of processing time "Y" caused by increase in hop count "X", may be considerably relaxed as depicted by line graph 2601.

Further, in the case of communication system 100 according to the third embodiment, processing time "Y" needed for distributing the whole labels may become approximately "A+C+(B+C)*X". This is because that multiple pieces of bandwidth check processing on different nodes along the communication path are performed concurrently. Accordingly, when using communication system 100 according to the third embodiment, it is possible to relax increase of processing time "Y" caused by increasing hop count "X", as depicted by line graph 2602.

As described above, according to the first, second, or third embodiment, a processing time needed for establishing a communication path may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication system for establishing a communication path in which a data packet is transferred using labels each being assigned to a data link connecting each pair of adjacent nodes along the communication path, the communication system comprising:
    an origination node positioned at an end of the communication path;
    a termination node positioned at the other end of the communication path; and
    one or more relay nodes positioned between the origination node and the termination node along the communication path, wherein
    the origination node is configured to create a path message for requesting establishment of the communication path, and to provide each of downstream nodes with the path message, the path message including route information identifying a sequence of nodes and interfaces along the communication path, the downstream nodes being nodes positioned in a downstream direction from the origination node towards the termination node along the communication path; and
    the each of the downstream nodes is configured to perform, on a predetermined condition, label assignment processing for assigning a label to a data link connecting the each of the downstream nodes and an adjacent upstream node, the adjacent upstream node being defined as a node adjacent to the each of the downstream nodes in an upstream direction from the termination node toward the origination node along the communication path, wherein
    the each of the one or more relay nodes performs the label assignment processing, on the predetermined condition of being provided with label assignment request information for requesting the label assignment processing, the label assignment request information being provided for the each of the one or more relay nodes without depending on the label assignment processing performed on other nodes of the downstream nodes, so that the label assignment processing is concurrently performed on the each of the downstream nodes to reduce a processing time needed for establishing the communication path coupling the origination and termination nodes through the one or more relay nodes.

2. The communication system of claim 1, wherein
    the path message is transferred between each pair of adjacent nodes along the communication path in a downstream direction from the origination node toward the termination node along the communication path, starting from the origination node until reaching the termination node;
    the each of the downstream nodes is provided with the path message by receiving the path message from the adjacent upstream node; and
    the termination node provides the each of the one or more relay nodes with the label assignment request information by transmitting a control message including the label assignment request information concurrently and directly to the each of the one or more relay nodes, so that the one or more relay nodes concurrently perform the label assignment processing at the time of receiving the control message including the label assignment request information, without depending on the label assignment processing performed on other nodes of the downstream nodes.

3. The communication system of claim 1, wherein
the path message includes the label assignment request information;
the path message is transferred between each pair of adjacent nodes along the communication path in a downstream direction from the origination node toward the termination node along the communication path, starting from the origination node until reaching the termination node; and
the each of the one or more relay nodes is provided with the label assignment request information by extracting the label assignment request information from the path message received from the adjacent upstream node, so that the one or more relay nodes concurrently perform the label assignment processing at the time of receiving the path message.

4. The communication system of claim 1, wherein
the path message includes bandwidth information indicating a bandwidth needed for transferring data packets along the communication path;
the origination node provides each of the downstream nodes with the path message by transmitting the path message concurrently and directly to the each of the downstream nodes; and
the each of the downstream nodes performs bandwidth check processing for checking whether there exists an available bandwidth needed for transferring data packets along the communication path, at the time of receiving the PATH directly from the origination node, without depending on the bandwidth check processing performed on other nodes of the downstream nodes, so that the bandwidth check processing is concurrently performed on the each of the downstream nodes.

5. The communication system of claim 1, wherein
the path message includes the label assignment request information and bandwidth information indicating a bandwidth needed for transferring data packets along the communication path;
the origination node provides each of the downstream nodes with the path message by transmitting the path message concurrently and directly to the each of the downstream nodes;
the each of the downstream nodes performs bandwidth check processing at the time of receiving the path message directly from the origination node, without depending on the bandwidth check processing performed on other nodes of the downstream nodes, so that the bandwidth check processing is concurrently performed on the each of the downstream nodes; and
the each of the one or more relay nodes is provided with the label assignment request information by extracting the label assignment request information from the path message that has been received directly from the origination node, so that the label assignment processing is concurrently performed on the each of the one or more relay nodes.

6. The communication system of claim 2, wherein
the termination node transmits the control message including the label assignment request information to the each of the one or more relay nodes before performing the label assignment processing on the termination node.

7. The communication system of claim 1, wherein
the path message includes bandwidth information indicating a bandwidth needed for transferring data packets along the communication path, and
the each of the downstream nodes, upon being provided with the path message, checks whether there exists an available bandwidth needed for transferring data packets along the communication path.

8. The communication system of claim 2, wherein
the each of the one or more relay nodes stores, in the path message, destination interface information identifying an output interface of the each of the one or more relay nodes, via which the path message is transmitted, and
the termination node transmits the control message including the label assignment request information to the output interface of the each of one or more relay nodes, using the destination interface information contained in the received path message as a destination address of the control message, so as to transmit the control message concurrently and directly to the each of the one or more relay nodes.

9. A method for establishing a communication path in which a data packet is transferred using labels each being assigned to a data link connecting each pair of adjacent nodes along the communication path, the method being performed by a sequence of nodes positioned along the communication path wherein the sequence of nodes includes an origination node positioned at an end of the communication path, a termination node positioned at the other end of the communication path, and one or more relay nodes positioned between the origination node and the termination node along the communication path, the method comprising:
creating, by the origination node, a path message for requesting establishment of the communication path, the path message including route information identifying a sequence of nodes and interfaces along the communication path;
providing, by the origination node, each of downstream nodes with the path message, the downstream nodes being nodes other than the origination node that are included in the sequence of nodes along the communication path;
performing, by the each of the downstream nodes, on a predetermined condition, label assignment processing for assigning a label to a data link connecting the each of the downstream nodes and an adjacent upstream node, the adjacent upstream node being defined as a node adjacent to the each of the downstream nodes in an upstream direction from the termination node toward the origination node along the communication path; and
performing, by the each of the one or more relay nodes, the label assignment processing on the predetermined condition of being provided with label assignment request information for requesting the label assignment processing, without depending on the label assignment processing performed by other nodes of the downstream nodes, so that the label assignment processing is concurrently performed on the each of the downstream nodes to reduce a processing time needed for establishing the communication path coupling the origination and termination nodes through the one or more relay nodes.

10. The method of claim 9, wherein
the path message is sequentially transferred between each pair of adjacent nodes along the communication path in a downstream direction from the origination node toward the termination node along the communication path, starting from the origination node until reaching the termination node;

the each of the downstream nodes is provided with the path message by receiving the path message from the adjacent upstream node; and the termination node provides the each of the one or more relay nodes with the label assignment request information by transmitting a control message including the label assignment request information concurrently and directly to the each of the one or more relay nodes, so that the one or more relay nodes concurrently perform the label assignment processing at the time of receiving the control message including the label assignment request information.

11. The method of claim 9, wherein
the path message includes the label assignment request information;
the path message is transferred between each pair of adjacent nodes along the communication path in a downstream direction from the origination node toward the termination node along the communication path, starting from the origination node until reaching the termination node; and
the each of the one or more relay nodes is provided with the label assignment request information by extracting the label assignment request information from the path message received from the adjacent upstream node, so that the one or more relay nodes concurrently perform the label assignment processing at the time of receiving the path message.

12. The method of claim 9, wherein
the path message includes bandwidth information indicating a bandwidth needed for transferring data packets along the communication path;
the origination node provides each of the downstream nodes with the path message by transmitting the path message concurrently and directly to the each of the downstream nodes; and
the each of the downstream nodes performs bandwidth check processing for checking whether there exists an available bandwidth needed for transferring data packets along the communication path, at the time of receiving the path message directly from the origination node, without depending on the bandwidth check processing performed on other nodes of the downstream nodes, so that the bandwidth check processing is concurrently performed on the each of the downstream nodes.

13. The method of claim 9, wherein
the path message includes the label assignment request information and bandwidth information indicating a bandwidth needed for transferring data packets along the communication path;
the origination node provides each of the downstream nodes with the path message by transmitting the path message concurrently and directly to the each of the downstream nodes;
the each of the downstream nodes performs bandwidth check processing at the time of receiving the path message directly from the origination node, without depending on the bandwidth check processing performed on other nodes of the downstream nodes, so that the bandwidth check processing is concurrently performed on the each of the downstream nodes; and
the each of the one or more relay nodes is provided with the label assignment request information by extracting the label assignment request information from the path message that has been received directly from the origination node, so that the label assignment processing is concurrently performed on the each of the one or more relay nodes.

14. An apparatus for establishing a communication path in which a data packet is transferred using labels each being assigned to a data link connecting each pair of adjacent nodes along the communication path, the communication path being established by a sequence of nodes including an origination node positioned at en end of the communication path, a termination node positioned at the other end of the communication path, and one or more relay nodes positioned between the origination node and the termination node along the communication path wherein the apparatus serves as the termination node, the apparatus comprising:
a message receiver configured to receive a path message that is sequentially transferred between each pair of adjacent nodes along the communication path, starting from the origination node until reaching the termination node; and
a message transmitter configured to transmit a control message including label assignment request information, directly to each of the one or more relay nodes, so that the each of the one or more relay nodes concurrently performs the label assignment processing at the time of receiving the control message including the label assignment request information to reduce a processing time needed for establishing the communication path coupling the origination and termination nodes through the one or more relay nodes.

15. An apparatus for establishing a communication path in which a data packet is transferred using labels each being assigned to a data link connecting each pair of adjacent nodes along the communication path, the communication path being established by a sequence of nodes including an origination node positioned at en end of the communication path, a termination node positioned at the other end of the communication path, and one or more relay nodes positioned between the origination node and the termination node along the communication path wherein the apparatus serves as each of the one or more relay nodes, the apparatus comprising:
a message receiver configured to receive a path message that is transferred between each pair of adjacent nodes along the communication path in a downstream direction from the origination node toward the termination node, starting from the origination node until reaching the termination node, the path message including label assignment request information for requesting assignment of a label to a data link connecting the apparatus and an adjacent upstream node, the adjacent upstream node being defined as a node adjacent to the apparatus along the communication path in a upstream direction from the termination node toward the origination node;
a message transmitter configured to transmit the path message received by the receiver to an adjacent downstream node, the adjacent downstream node being defined as a node adjacent to the apparatus in a downstream direction from the origination node toward the termination node along the communication path; and
a signaling processing part configured to perform, at the time when the message receiver has received the path message, the label assignment processing without depending on the label assignment processing performed on other nodes of downstream nodes, the downstream nodes being defined as nodes other than the origination node that are included in the sequence of nodes along the communication path, so that the label assignment processing is concurrently performed on the each of the downstream nodes to reduce a processing time needed for establishing the communication path coupling the origination and termination nodes through the one or more relay nodes.

* * * * *